US011488588B2

(12) United States Patent
Shiga

(10) Patent No.: US 11,488,588 B2
(45) Date of Patent: Nov. 1, 2022

(54) VOICE CONTROL SYSTEM AND CONTROL METHOD FOR CONTROLLING PRINTING APPARATUS

(71) Applicant: CANON KABUSHIKI KAISHA, Tokyo (JP)

(72) Inventor: Toshiki Shiga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/184,076

(22) Filed: Nov. 8, 2018

(65) Prior Publication Data

US 2019/0156825 A1    May 23, 2019

(30) Foreign Application Priority Data

Nov. 20, 2017    (JP) .............................. JP2017-223057

(51) Int. Cl.
*G10L 15/22*    (2006.01)
*G06F 3/16*    (2006.01)
*G10L 15/30*    (2013.01)

(52) U.S. Cl.
CPC .............. *G10L 15/22* (2013.01); *G06F 3/167* (2013.01); *G10L 15/30* (2013.01); *G10L 2015/223* (2013.01)

(58) Field of Classification Search
CPC ................................. G10L 15/22; G06F 3/167
See application file for complete search history.

(56) References Cited

U.S. PATENT DOCUMENTS

| 6,216,104 | B1 * | 4/2001 | Moshfeghi ............ G06F 19/325 704/260 |
| 6,701,095 | B1 | 3/2004 | Fujimoto et al. |
| 8,498,290 | B2 * | 7/2013 | Hughston ........... H04L 65/1046 370/352 |

(Continued)

FOREIGN PATENT DOCUMENTS

| JP | 2000-216924 A | 8/2000 |
| JP | 2008-236036 A | 10/2008 |

(Continued)

OTHER PUBLICATIONS

Office Action dated Sep. 10, 2021, in Japanese Patent Application No. 2017-223057.

*Primary Examiner* — Michael N Opsasnick
(74) *Attorney, Agent, or Firm* — Venable LLP

(57) ABSTRACT

In a control system including a printing apparatus and a server system, the server system includes a transmission unit that, if a voice instruction received by a voice control device is a query regarding the printing apparatus, transmits information concerning the printing apparatus without performing processing of content used for print processing, and a specification unit that, if the received voice instruction is a print instruction for printing the content and includes a print setting value corresponding to a first item but not a print setting value corresponding to a second item, specifies content corresponding to the print instruction, a print setting value corresponding to the first item, and a preset, predetermined print setting value for the second item. The printing apparatus includes a print control unit that performs print processing based on the content, the print setting value corresponding to the first item, and the specified predetermined print setting value.

19 Claims, 17 Drawing Sheets

(56) References Cited

U.S. PATENT DOCUMENTS

| | | |
|---|---|---|
| 9,271,111 B2 | 2/2016 | Blanksteen |
| 10,079,954 B2 | 9/2018 | Morita et al. |
| 2003/0018829 A1* | 1/2003 | Carney .................. G06F 9/542 |
| | | 719/321 |
| 2008/0290987 A1* | 11/2008 | Li .......................... G06Q 30/02 |
| | | 340/5.1 |
| 2011/0063323 A1* | 3/2011 | Jabri .................... A61B 6/4494 |
| | | 345/619 |
| 2013/0297320 A1* | 11/2013 | Buser ...................... G10L 17/22 |
| | | 704/275 |
| 2014/0046473 A1* | 2/2014 | Boynton ............... B29C 64/393 |
| | | 700/119 |
| 2014/0195278 A1* | 7/2014 | Denker ................. G06Q 30/02 |
| | | 705/5 |
| 2015/0036174 A1* | 2/2015 | Pettis .................... G06F 3/1288 |
| | | 358/1.15 |
| 2015/0077800 A1* | 3/2015 | Yamagishi ............ G06F 3/1208 |
| | | 358/1.15 |
| 2016/0014445 A1* | 1/2016 | Belz ................. H04N 21/43615 |
| | | 725/38 |
| 2016/0034253 A1* | 2/2016 | Bang ..................... G06F 9/5055 |
| | | 715/728 |
| 2016/0112585 A1* | 4/2016 | Park ...................... G06F 3/1222 |
| | | 358/1.15 |
| 2016/0185044 A1* | 6/2016 | Leonard ................. G05B 15/02 |
| | | 700/98 |
| 2016/0232435 A1* | 8/2016 | Adachi ................. G06K 15/408 |
| 2016/0314782 A1* | 10/2016 | Klimanis .............. G10L 15/065 |
| 2017/0070625 A1 | 3/2017 | Yee et al. |
| 2017/0277148 A1* | 9/2017 | Sato .................. G05B 19/4099 |
| 2018/0017916 A1* | 1/2018 | Sasaki ..................... B41J 29/38 |
| 2018/0288248 A1* | 10/2018 | Shen ...................... G10L 15/30 |

FOREIGN PATENT DOCUMENTS

| | | |
|---|---|---|
| JP | 2016-502192 A | 1/2016 |
| JP | 2016-224711 A | 12/2016 |
| JP | 2017-055190 A | 3/2017 |
| WO | 2014/092980 A1 | 6/2014 |

* cited by examiner

F I G. 13

| ID | SETTING ITEM | SET VALUES |
|---|---|---|
| 1 | NUMBER OF COPIES | 1-9999 |
| 2 | PAPER TYPE | PLAIN PAPER, PHOTO PAPER, FINE ART PAPER, ENVELOPE, POSTCARD ··· |
| 3 | PRINT QUALITY | FINE, STANDARD, DRAFT ··· |
| 4 | COLOR | COLOR, MONOCHROME, AUTO |
| 5 | DOUBLE-SIDED PRINTING | DOUBLE-SIDED, SINGLE-SIDED |
| 6 | PAPER SIZE | LETTER, LEGAL, A5, A, A3, B5, L SIZE, 2L SIZE ··· |
| 7 | PAPER ORIENTATION | PORTRAIT, LANDSCAPE, AUTO |
| 8 | PAGE LAYOUT | DIRECT, BORDERLESS FULL-PAGE PRINTING, ALLOCATION (2 PAGES/SHEET) ··· |
| 9 | BINDING LOCATION | LONG EDGE (LEFT), LONG EDGE (RIGHT), SHORT EDGE (LEFT), SHORT EDGE (RIGHT) |
| 10 | PAGE DESIGNATION | ALL, SELECTED PART, CURRENT PAGE, PAGE DESIGNATION |
| 11 | ··· | ··· |

F I G. 14

| | PRINT SETTING 1 (PHOTO) | PRINT SETTING 2 (DOCUMENT) |
|---|---|---|
| NUMBER OF COPIES | 1 | 1 |
| PAPER TYPE | PHOTO PAPER | PLAIN PAPER |
| PRINT QUALITY | FINE | STANDARD |
| COLOR | COLOR | AUTO |
| DOUBLE-SIDED/SINGLE-SIDED | SINGLE-SIDED | DOUBLE-SIDED |
| PAPER SIZE | L SIZE | A4 |
| PAPER ORIENTATION | AUTO | AUTO |
| PAGE LAYOUT | BORDERLESS FULL-PAGE PRINTING | 2 PAGES/SHEET |
| BINDING LOCATION | — | LONG EDGE (LEFT) |
| PAGE DESIGNATION | ALL | ALL |
| ... | ... | ... |

VOICE CONTROL SYSTEM AND CONTROL METHOD FOR CONTROLLING PRINTING APPARATUS

BACKGROUND OF THE INVENTION

Field of the Invention

The present invention relates to a voice control system including a voice control device, a control method, and a non-transitory computer-readable storage medium storing a program.

Description of the Related Art

Japanese Patent Laid-Open No. 2016-502192 discloses techniques of performing various kinds of processing by instructing a conventional voice control device by voice. A connected printing apparatus can be caused to perform printing using these techniques.

However, in Japanese Patent Laid-Open No. 2016-502192, if there exist a plurality of set values that an output apparatus such as a printer can receive, it is difficult to efficiently cause a user to recognize the plurality of set values.

SUMMARY OF THE INVENTION

An aspect of the present invention is to eliminate the above-mentioned problems with the conventional technology. The present invention provides a voice control system that improves usability in notifying information concerning an output apparatus, a control method, and a non-transitory computer-readable storage medium storing a program.

The present invention in one aspect provides a voice control system that includes a voice control device configured to receive a voice instruction and can control an output apparatus by the voice instruction, comprising: a notification unit configured to, in a case in which the voice instruction received by the voice control device is a query about the output apparatus, preferentially notify information corresponding to a condition in pieces of information concerning the output apparatus acquired based on the query.

According to the present invention, it is possible to improve usability in notifying information concerning an output apparatus.

Further features of the present invention will become apparent from the following description of exemplary embodiments with reference to the attached drawings.

BRIEF DESCRIPTION OF THE DRAWINGS

FIG. 13 is a view showing print setting items;

FIG. 14 is a view showing registered print settings;

DESCRIPTION OF THE EMBODIMENTS

Figure 1:
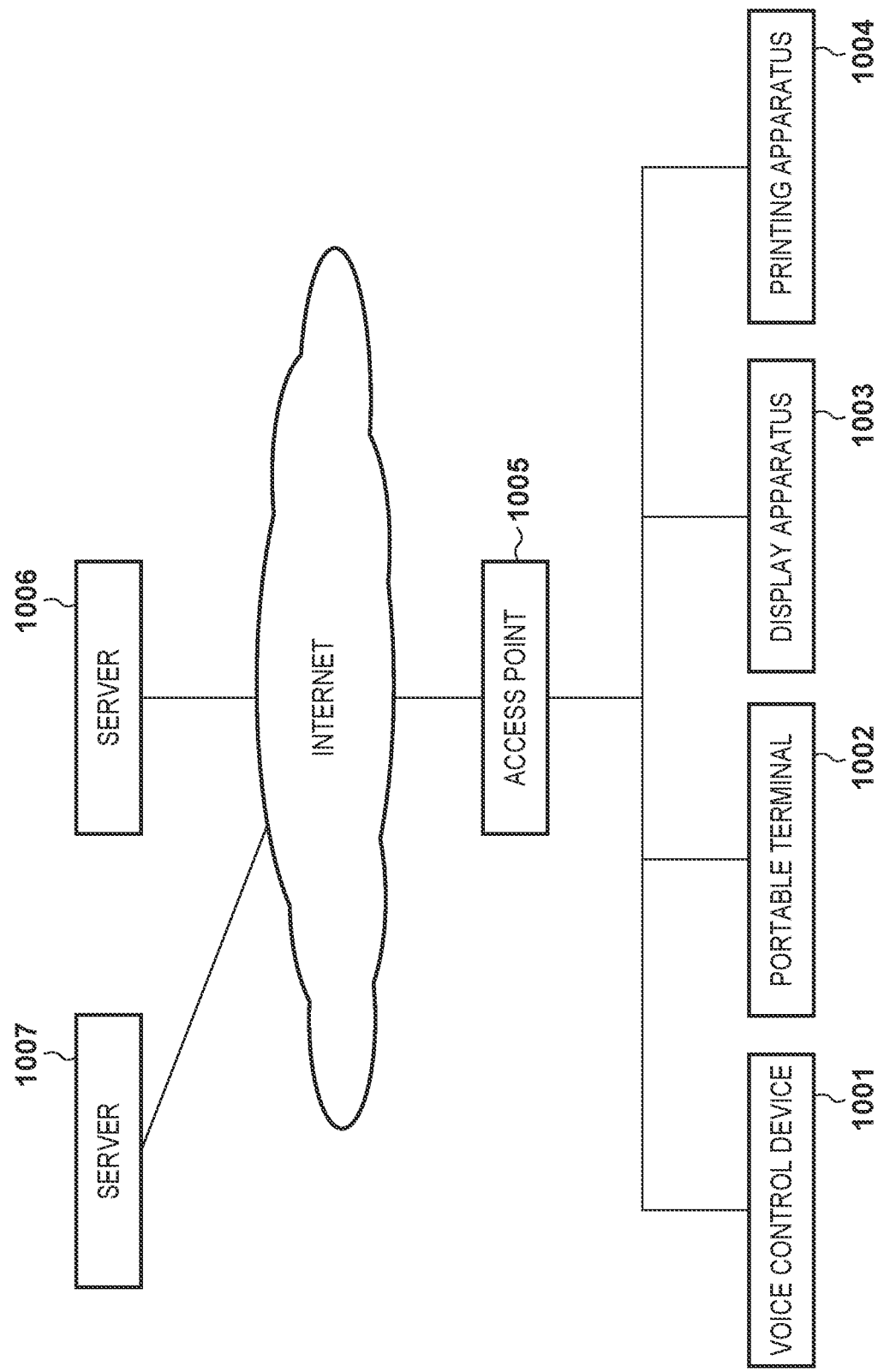
FIG. 1 is a block diagram showing a system configuration.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

First Embodiment

FIG. 1 shows an example of the configuration of a voice control system according to this embodiment. The system according to this embodiment includes, for example, a voice control device 1001, a portable terminal 1002, a display apparatus 1003, a printing apparatus 1004, an access point (AP) 1005, and a server 1006 (information processing apparatus). This system is a system capable of controlling a printing apparatus and the like by a voice received by the voice control device. The voice control device 1001 is, for example, a smart speaker. The portable terminal 1002 is, for example, an arbitrary portable terminal such as a smartphone, a notebook PC (Personal Computer), a tablet terminal, or a PDA (Personal Digital Assistant). Note that a description will be made below assuming that the portable terminal 1002 is a smartphone. Additionally, in this embodiment, a desktop PC may be used as the portable terminal 1002. Hence, the portable terminal is sometimes called a terminal apparatus. The display apparatus 1003 is, for example, an apparatus such as a TV or a display having a display function. The printing apparatus 1004 is, for example, a printer but may be a copying machine, a facsimile apparatus, a digital camera, or the like. In addition, the printing apparatus 1004 may be a multi-function peripheral having a plurality of functions such as a copy function, a FAX function, and a printing function. That is, the printing apparatus 1004 is an output apparatus that performs printing, display, and the like, and the output form is not limited to printing. Note that if the printing apparatus 1004 is an apparatus for executing a printing function, it is a printer such as an inkjet printer, a full-color laser beam printer, or a monochrome printer.

The voice control device 1001, the portable terminal 1002, the display apparatus 1003, and the printing apparatus 1004 can be connected to (communicate with) the server 1006 via the AP 1005 and the Internet. In addition, the voice control device 1001, the portable terminal 1002, the display apparatus 1003, and the printing apparatus 1004 can be connected to (communicate with) each other via the AP 1005. FIG. 1 shows each device as a single device. However, each device may include a plurality of devices connected.

Arrangement of Voice Control Device 1001

Figure 2:
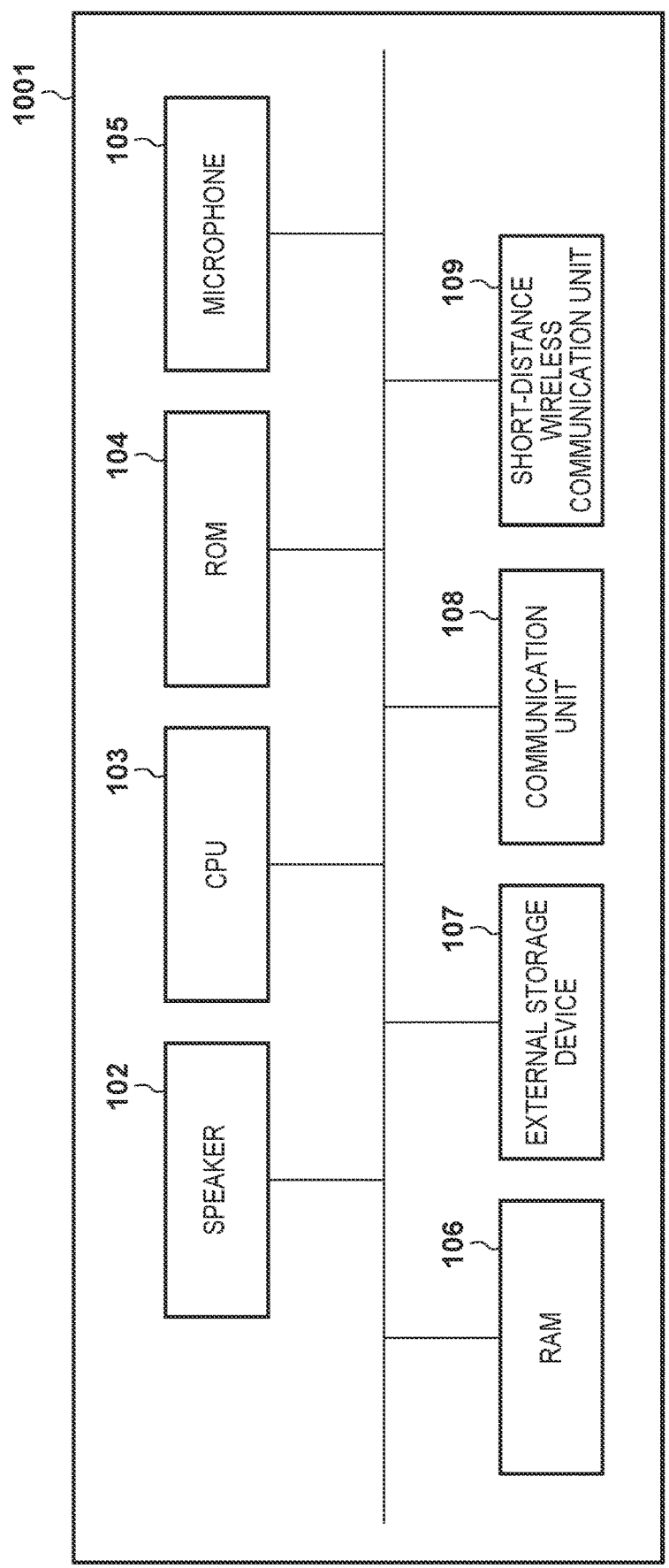
FIG. 2 is a block diagram showing the hardware arrangement of a voice control device.

FIG. 2 is a block diagram showing the hardware arrangement of the voice control device 1001. The voice control device 1001 includes a speaker 102, a CPU 103, a ROM 104, a microphone 105, a RAM 106, an external storage device 107, a communication unit 108, and a short-distance wireless communication unit 109. Note that the blocks shown in FIGS. 2 to 4 and 8 are connected to each other using, for example, an internal bus. In addition, CPU is the acronym of Central Processing Unit, ROM is the acronym of Read Only Memory, and RAM is the acronym of Random Access Memory. Note that the components are merely examples, and each device may include hardware other than the illustrated pieces of hardware. A plurality of blocks shown in FIGS. 2 to 4 and 8 may be integrated into one block and thus implemented. Alternatively, one block may be divided into two or more blocks and thus implemented. That is, each device can have an arbitrary arrangement within a scope in which processing to be described later can be executed.

The speaker 102 generates a voice by processing to be described later. The CPU 103 is a system control unit and controls the entire voice control device 1001. The ROM 104 stores fixed data such as control programs to be executed by the CPU 103, data tables, and an embedded OS (Operating System) program. In this embodiment, the control programs stored in the ROM 104 are used to perform software execution control such as scheduling, task switching, and interrupt processing under the management of the embedded OS stored in the ROM 104. The microphone 105 receives a voice on the periphery of the voice control device. When a voice uttered by a user is received, the voice is converted into electronic data via the microphone 105 and stored in the RAM 106. For example, the RAM 106 that receives the voice uttered by the user is formed by an SRAM (Static RAM) or the like which needs a backup power supply. Note that the RAM 106 holds data by a primary battery for backup and can therefore store data such as a program control variable without volatilizing it. In addition, a memory area to store the setting information and management data of the voice control device 1001 is also provided in the RAM 106. The RAM 106 is also used as the main memory and the work memory of the CPU 103. The external storage device 107 stores application software.

The communication unit 108 includes a circuit and an antenna configured to perform communication in accordance with a predetermined wireless communication method. For example, the communication unit 108 can wirelessly be connected to the AP 1005. In addition, the communication unit 108 sometimes operates as an AP that is temporarily used. Note that the AP 1005 can be, for example, a device such as a wireless LAN router. The wireless communication used in this embodiment may have a capability of operating in accordance with the wireless communication method of a wireless LAN complying with the IEEE 802.11 standard series or may have a capability of operating in accordance with another wireless communication method. In this embodiment, the IEEE 802.11 standard series includes a series of standards belonging to IEEE 802.11, like IEEE 802.11a and IEEE 802.11b.

The short-distance wireless communication unit 109 executes short-distance wireless communication with another device existing within a predetermined range (within the short-distance range) from the voice control device 1001. Note that the short-distance wireless communication unit 109 performs communication using a wireless communication method different from that of the communication unit 108. In this embodiment, the short-distance wireless communication unit 109 operates in accordance with the Bluetooth® standard. Additionally, in this embodiment, the communication speed of the wireless communication using the communication unit 108 is higher than the communication speed of the short-distance wireless communication using the short-distance wireless communication unit 109. Furthermore, in this embodiment, the communication distance of the wireless communication using the communication unit 108 is longer than the communication distance of the short-distance wireless communication using the short-distance wireless communication unit 109. Note that this also applies to the communication units and the short-distance wireless communication units of other apparatuses to be described later.

Arrangement of Portable Terminal 1002 and Display Apparatus 1003

Figure 3:
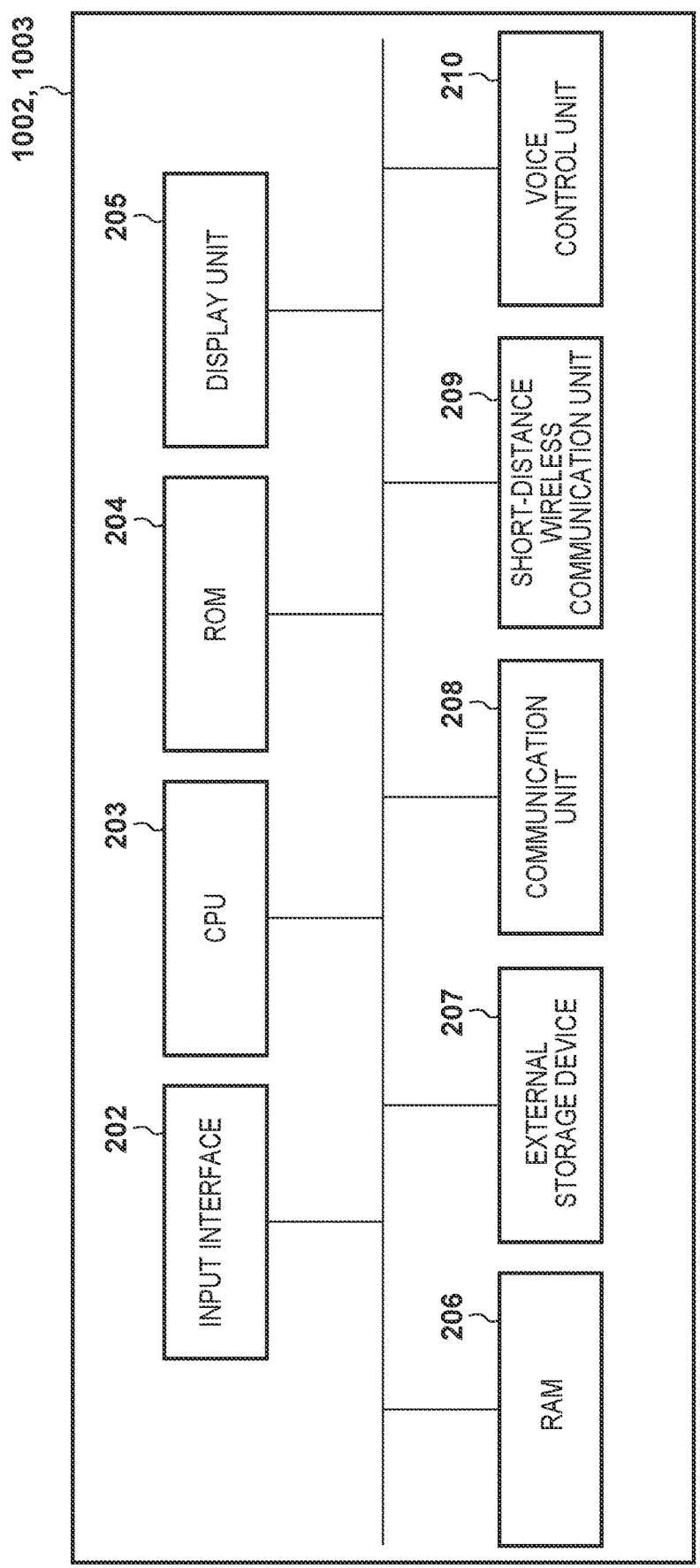
FIG. 3 is a block diagram showing the hardware arrangement of a portable terminal and a display apparatus.

FIG. 3 is a block diagram showing the hardware arrangement of the portable terminal 1002 and the display apparatus 1003. Each of the portable terminal 1002 and the display apparatus 1003 includes, for example, an input interface 202, a CPU 203, a ROM 204, a display unit 205, a RAM 206, an external storage device 207, a communication unit 208, and a short-distance wireless communication unit 209. Note that these blocks are connected to each other using, for example, an internal bus.

The CPU 203 is a system control unit and controls the entire apparatus. The RAM 206 is formed by a DRAM (Dynamic RAM) or the like which needs a backup power supply, like, for example, the RAM 106. The RAM 206 is also used as the main memory and the work memory of the CPU 203. The ROM 204 stores fixed data such as control programs to be executed by the CPU 203, data tables, and an OS program.

The communication unit 208 has the same function as that of the above-described communication unit 108 and can wirelessly be connected to another device via the AP 1005. The short-distance wireless communication unit 209 is a device capable of performing short-distance wireless communication with the short-distance wireless communication unit 109 using the same wireless communication method as that of the short-distance wireless communication unit 109.

In this embodiment, the portable terminal 1002 and the display apparatus 1003 are explained as independent different apparatuses. However, they may be integrated. That is, for example, the portable terminal 1002 may be used as the display apparatus 1003. In addition, the portable terminal 1002 may be used as the voice control device 1001. In this case, the portable terminal 1002 may include, for example, a voice control unit 210 that operates with the functions of both the speaker 102 and the microphone 105. The voice control unit 210 can receive, by the microphone, a language uttered as a voice by the user. The CPU 203 analyzes the language, thereby converting the voice into an electronic instruction. For example, when the user utters a device name by voice, the voice data is received and analyzed, thereby recognizing it as the ID of a specific device. In addition, contents stored in the RAM 206 can be converted into a language understandable by a human and output as a voice from the speaker. For example, a list of device IDs held in the RAM 206 can be converted into a language (names or the like) understandable by a human and output as a voice.

Arrangement of Printing Apparatus 1004

Figure 4:
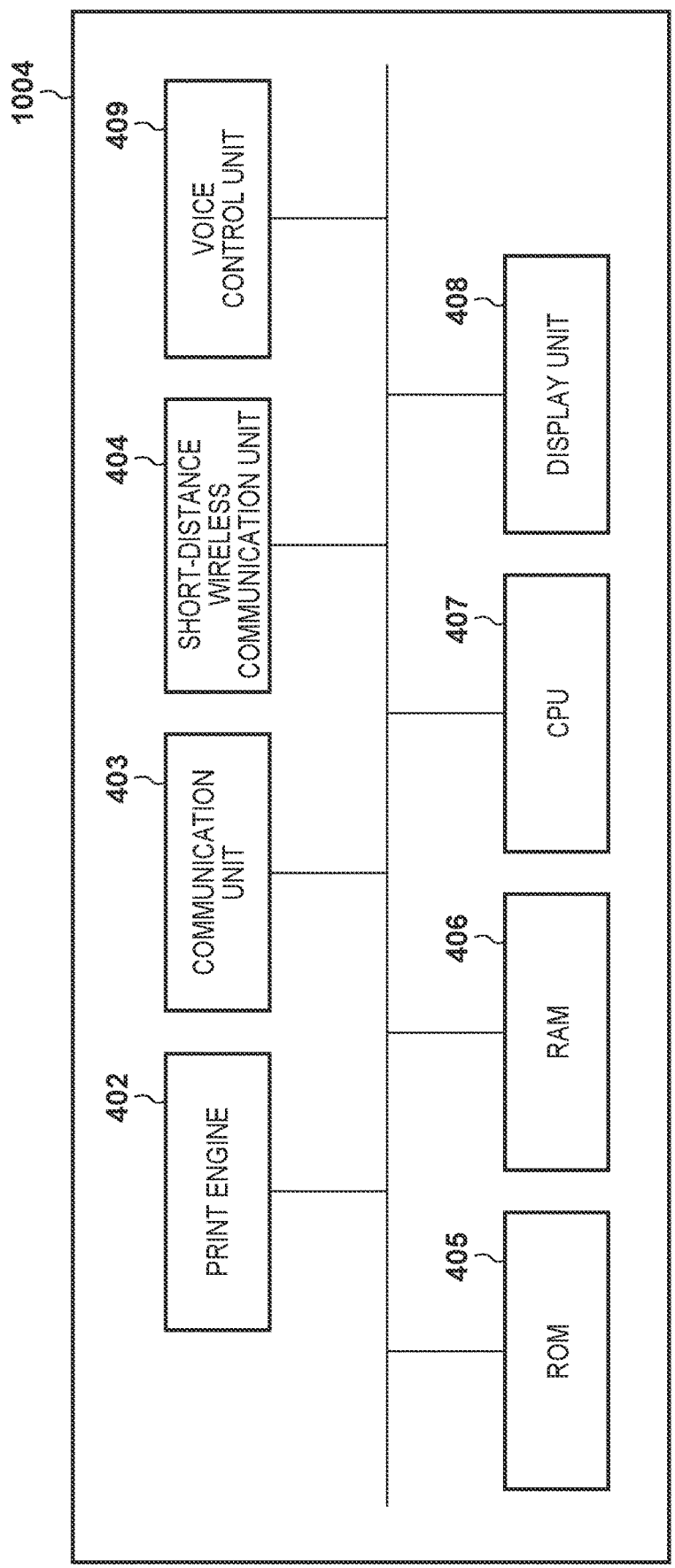
FIG. 4 is a block diagram showing the hardware arrangement of a printing apparatus.

FIG. 4 is a block diagram showing the hardware arrangement of the printing apparatus 1004. The printing apparatus 1004 includes, for example, a print engine 402, a communication unit 403, a short-distance wireless communication unit 404, a ROM 405, a RAM 406, a CPU 407, a display unit 408, and a voice control unit 409.

The CPU 407 is a system control unit and controls the entire printing apparatus 1004. The RAM 406 is formed by a DRAM (Dynamic RAM) or the like which needs a backup power supply, like, for example, the RAM 106. The RAM 406 is also used as the main memory and the work memory of the CPU 407. The ROM 405 stores fixed data such as control programs to be executed by the CPU 407, data tables, and an OS program.

The communication unit 403 has the same function as that of the above-described communication unit 108 and can wirelessly be connected to another device via the AP 1005. The short-distance wireless communication unit 404 is a device capable of performing short-distance wireless communication with the short-distance wireless communication unit 109 using the same wireless communication method as that of the short-distance wireless communication unit 109. The print engine 402 forms an image on a print medium such as paper using a printing material such as ink based on a print job received via the communication unit 403 and outputs the printing result. The display unit 408 is an interface configured to receive a data input or operation instruction from the user and includes an operation panel formed by a physical keyboard and buttons, a touch panel, or the like.

The voice control unit 409 can receive, by a microphone, a language uttered as a voice by the user. The CPU 407 analyzes the language, thereby converting the voice into an electronic instruction. For example, when the user utters a device name by voice, the voice data is received and analyzed, thereby recognizing it as the ID of a specific device. In addition, contents stored in the RAM 406 can be converted into a language understandable by a human and output as a voice from a speaker. For example, a list of device IDs held in the RAM 406 can be converted into a language (names or the like) understandable by a human and output as a voice.

Setup of Voice Control Device 1001

Figure 5:
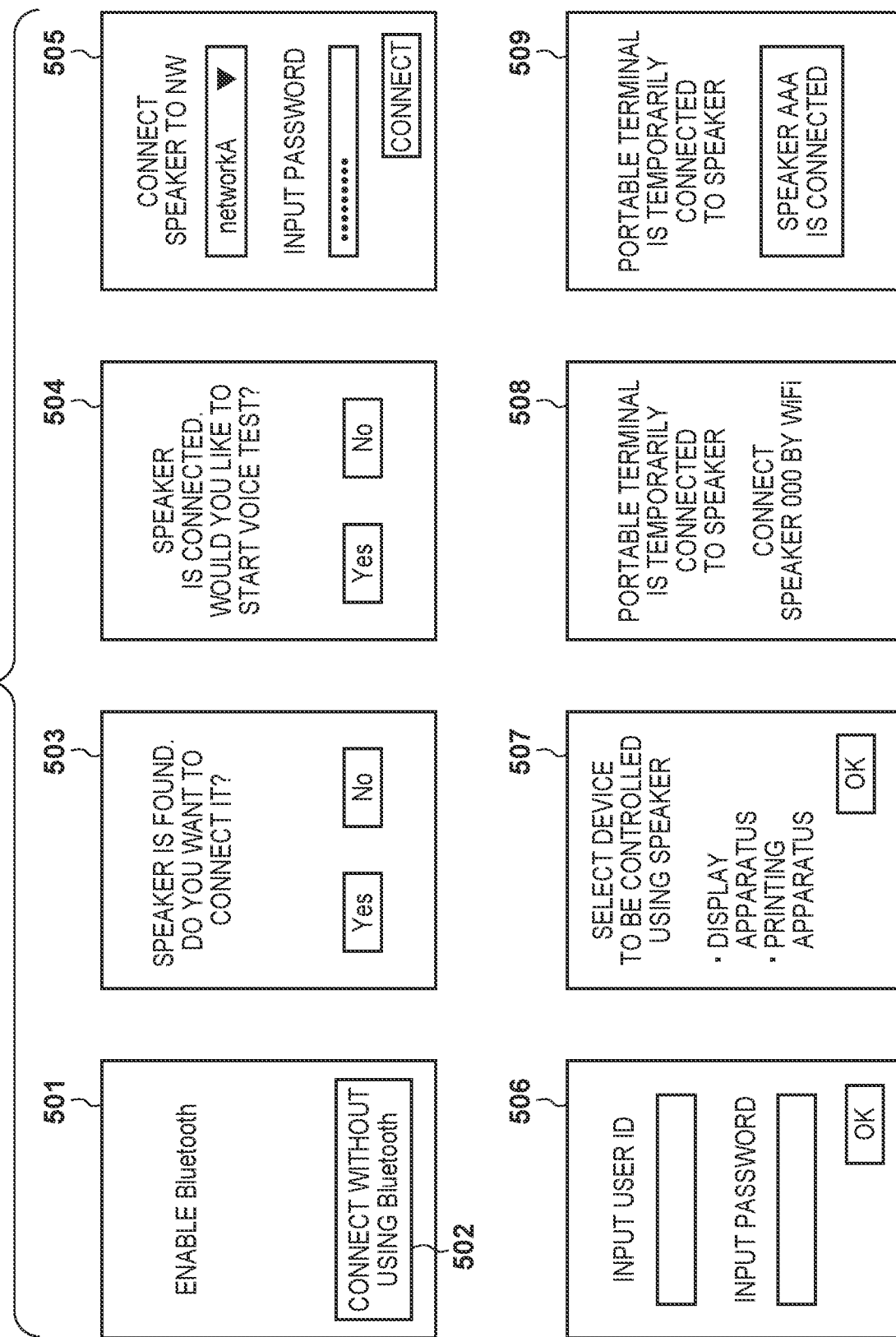
FIG. 5 is a view showing screens associated with setup of the voice control device.

Setup of the voice control device 1001 will be described next with reference to FIG. 5. FIG. 5 is a schematic view showing examples of screens displayed by the portable terminal 1002 for setup of the voice control device 1001. A management application for the voice control device 1001 is installed in advance in the portable terminal 1002.

When the management application is activated by a user operation, a screen 501 is displayed on the display unit 205 of the portable terminal 1002. Here, the user enables the short-distance wireless communication unit 209 (for example, Bluetooth) of the portable terminal 1002 in accordance with a message displayed on the screen 501. When the voice control device 1001 is activated, it generates a beacon including a specific identifier. If the beacon generated by the voice control device 1001 is received using the management application, the portable terminal 1002 displays a screen 503. When the "Yes" button is pressed on the screen 503, short-distance wireless connection is established between the portable terminal 1002 and the voice control device 1001.

When the short-distance wireless connection between the portable terminal 1002 and the voice control device 1001 is established, a screen 504 is displayed on the display unit 205 of the portable terminal 1002. Here, when the user presses the "Yes" button on the screen 504, voice data is transmitted from the portable terminal 1002 to the voice control device 1001 via the short-distance wireless connection, and a voice is output from the speaker 102 to the voice control device 1001. Note that the portable terminal 1002 may transmit a notification instruction by voice to the voice control device 1001 via the short-distance wireless connection, and the voice may thus be output from the speaker 102 of the voice control device 1001. If the voice is output from the voice control device 1001, the user presses a "test completion button" displayed next to the screen 504, whereby a screen 505 is displayed on the display unit 205 of the portable terminal 1002.

On the screen 505, the user inputs the SSID and the password of an AP that should be connected to the voice control device 1001 to the screen 505 and presses the connect button. Basically, the user inputs, using the screen 505, the SSID and the password of the AP 1005 (the AP 1005 that is being wirelessly connected) to which the portable terminal 1002 is already wirelessly connected using the communication unit 208. With this processing, the portable terminal 1002 transmits the SSID and the password to the voice control device 1001 via the short-distance wireless connection. The voice control device 1001 establishes wireless connection with the AP 1005 using the SSID and the password received via the short-distance wireless connection. That is, the voice control device 1001 participates in the network formed by the AP 1005. With the above-described processing, the voice control device 1001 and the portable terminal 1002 can perform wireless communication via the AP 1005 (via the network formed by the AP 1005).

Next, the user inputs a user ID and a password needed to log in to the server 1006 using a screen 506 displayed on the portable terminal 1002. Note that the user ID and the password input in the screen 506 are transmitted from the portable terminal 1002 to the voice control device 1001 via the short-distance wireless connection or the AP 1005. The voice control device 1001 signs in to the server 1006 using the user ID and the password received from the portable terminal 1002. At this time, the voice control device 1001 transmits the Mac address of itself as well. This allows the voice control device 1001 to use a service provided by the server 1006 to the user. That is, the server 1006 manages the Mac address of the voice control device 1001 and the user ID in association with each other. Here, the voice control device 1001 may receive the access token of the server 1006.

Using a screen 507 displayed next to the screen 506, the user selects a device to be controlled using the voice control device 1001. Assume here that the user selects the display apparatus 1003 and the printing apparatus 1004 as indicated by the screen 507. Devices displayed on the screen 507 are displayed when the portable terminal 1002 searches for the devices (apparatuses) in the network via the AP 1005. At this time, as the result of device search processing, the portable terminal 1002 acquires the Mac address, IP address, and the like of each device at the time of the device search. For this reason, when the OK button is pressed in the screen 507, the portable terminal 1002 transmits the Mac address and the IP address of each device to the voice control device 1001.

Note that setup of the voice control device 1001 may be performed using another method. For example, when the voice control device 1001 is activated (or a setup mode is enabled), the communication unit 108 of the voice control device 1001 may operate as a software AP to do setup. As a detailed example, for example, when "connect without using Bluetooth" 502 is pressed on the screen 501, the portable terminal 1002 displays a screen 508. The user operates the portable terminal 1002 in accordance with contents displayed on the screen 508. By this user operation, the portable terminal 1002 establishes wireless connection with the software AP of the voice control device 1001 using the communication unit 208. Note that the portable terminal 1002 may establish the wireless connection with the software AP of the voice control device 1001 in accordance with an instruction of the management application. That is, the connection destination of the communication unit 208 of the portable terminal 1002 is temporarily switched from the AP 1005 to the software AP of the communication unit 108 of the voice control device 1001 in accordance with a user operation or an instruction of the management application. When the wireless connection is established between the communication unit 208 of the portable terminal 1002 and the communication unit 108 of the voice control device 1001 by such control, a screen 509 is displayed.

Note that as subsequent processing, information (the SSID, the password, and the like) input to the screen 505 is transmitted via the wireless connection established between the communication unit 208 of the portable terminal 1002 and the communication unit 108 of the voice control device 1001. After that, to perform wireless communication between the portable terminal 1002 and the voice control device 1001 via the AP 1005, the portable terminal 1002 switches the connection destination to the AP 1005. In addition, the voice control device 1001 disables the software AP and is wirelessly connected to the AP 1005 using the communication unit 108.

As described above, the voice control device 1001 can receive the pieces of information (the SSID, the password, and the like) concerning the AP 1005 that is an external access point from the portable terminal 1002 by wireless communication via the access point provided in the voice control device 1001. In addition, the voice control device 1001 can execute reception processing of receiving the pieces of information (the SSID, the password, and the like) concerning the external AP 1005 from the portable terminal 1002 via the short-distance wireless communication. The voice control device 1001 may have only one of the two reception processing functions described above or may have both the reception processing functions. Alternatively, the voice control device 1001 may be connected to the external access point 1005 and establish wireless communication by another reception processing function.

Sign-In Processing of Printing Apparatus 1004 to Server 1006

Processing of causing the printing apparatus 1004 to sign in to the server 1006 will be described next. For example, in the Internet, the server 1006 corresponding to the voice control device 1001 and a server 1007 that does not correspond to the voice control device 1001 exist. To implement cooperation between the voice control device 1001 and the printing apparatus 1004, the printing apparatus 1004 needs to sign in not to the server 1007 but to the server 1006.

Figure 6:
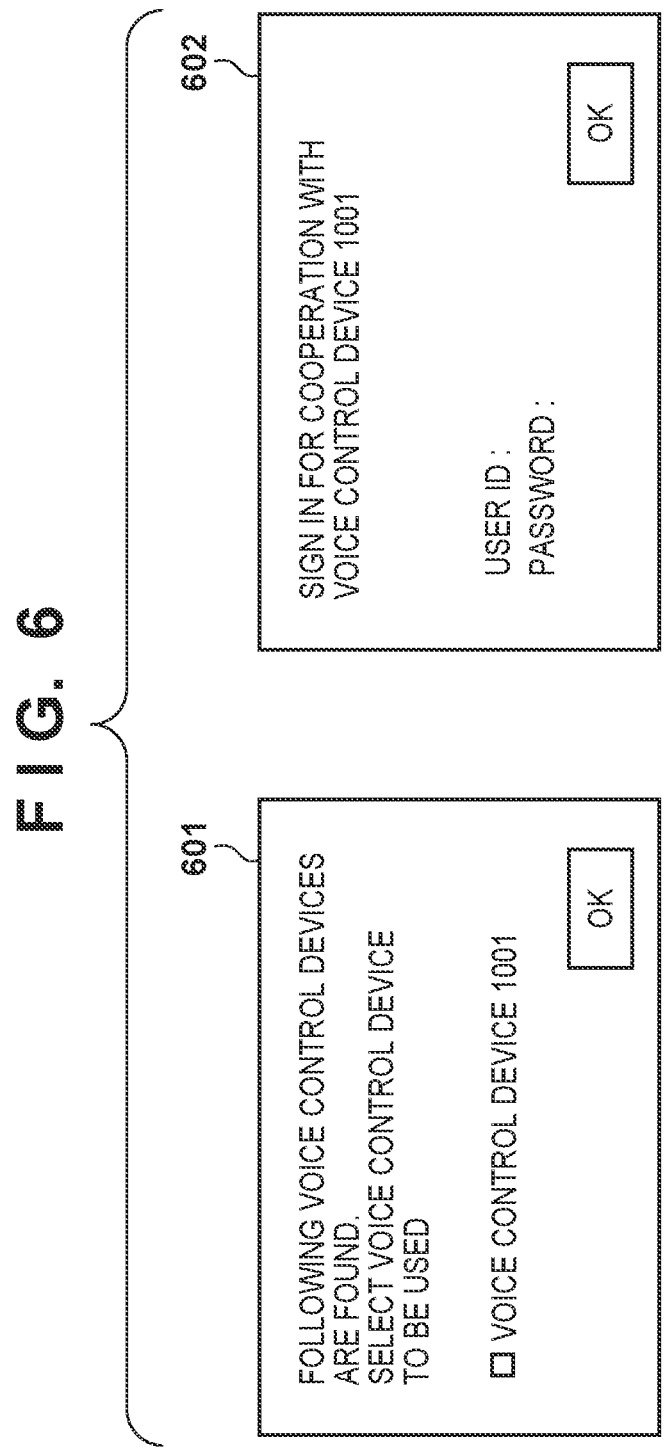
FIG. 6 is a view showing screens displayed by the printing apparatus.

For this purpose, the printing apparatus 1004 has a voice control device cooperation mode. When the voice control device cooperation mode is enabled, the printing apparatus 1004 performs a device search in the network in which it participates and finds the voice control device 1001. To notify that the voice control device 1001 is found as the result of the device search, a screen 601 shown in FIG. 6 is displayed on the display unit 408 of the printing apparatus 1004.

When the user selects the voice control device 1001 and presses the OK button on the screen 601, a screen 602 is displayed on the display unit 408 of the printing apparatus 1004. Note that information acquired by the device search includes, for example, the URL of the server 1006 corresponding to the voice control device 1001. Using the URL, the printing apparatus 1004 can display the screen 602 used to sign in to the server 1006. Then, the printing apparatus 1004 can sign in to the server 1006 using information (the user ID and the password) input to the screen 602. With the above-described processing, the printing apparatus 1004 can sign in to the server 1006 and handle image data managed by the server 1006.

In addition, when the printing apparatus 1004 performs the device search, and the voice control device capable of corresponding to the server 1007 is thus found, the printing apparatus 1004 displays a screen used to sign in to the server 1007.

Note that another process may be executed as the processing of causing the printing apparatus 1004 to sign in to the server 1006. An example of the other processing will be described. First, a state in which the portable terminal 1002 has completed sign-in to the server 1006 is obtained. For example, the user signs in to the server 1006 using the above-described screen 506. When the portable terminal 1002 finds the printing apparatus 1004 via the AP 1005, the portable terminal 1002 displays the identification information of the printing apparatus 1004 and a registration button. For example, the registration button may be displayed next to the printing apparatus in the screen 507. Here, if the user presses the registration button, a registration request is transmitted from the portable terminal 1002 to the printing apparatus 1004. Note that the registration request includes the destination information of the server 1006.

Upon receiving the registration request, the printing apparatus 1004 displays, on the display unit 408 of the printing apparatus 1004, a selection screen to select whether to execute registration processing of the printer. Here, if the user selects execution of registration processing, the printing apparatus 1004 transmits a registration request including the Mac address of the printing apparatus 1004 to the server 1006 in accordance with the destination information included in the registration request. The printing apparatus 1004 then receives a response to the registration request from the server 1006. Note that the response includes a URL concerning the registration processing of the printing apparatus 1004. That is, the URL is a dedicated URL concerning the registration processing of the printing apparatus 1004.

The printing apparatus 1004 transmits the response received from the server 1006 to the portable terminal 1002. The portable terminal 1002 transmits a registration request to the server 1006 using the URL included in the received response. The registration request includes the user ID and the password already input to the portable terminal 1002 to sign in to the server 1006. If the correct user ID and password are received, the server 1006 that has received the registration request transmits a response representing that the registration request has succeeded to the portable terminal 1002. That is, since the registration request is received using the dedicated URL concerning the registration processing of the printing apparatus 1004, the server 1006 temporarily registers the printing apparatus 1004 as a printing apparatus for the user who has signed in to the portable terminal 1002. The server 1006 manages the user ID and the Mac address of the printing apparatus 1004 in association with each other. The portable terminal 1002 transmits completion information representing that the registration is completed to the printing apparatus 1004. Upon receiving the completion information, the printing apparatus 1004 transmits a registration request including the Mac address of the printing apparatus 1004 to the server 1006. The server 1006 identifies that the printing apparatus 1004 is in a temporarily registered state and returns a registration completion response.

With the above-described processing, the server 1006 formally registers the printing apparatus 1004 as the printing apparatus for the user has signed in to the portable terminal 1002. Upon receiving the registration completion response from the server 1006, the printing apparatus 1004 transmits information representing registration completion to the portable terminal 1002. With the above-described processing, the printing apparatus 1004 may be unable to handle image data managed by the server 1006.

Processing Procedure of Print Instruction

Figure 7:
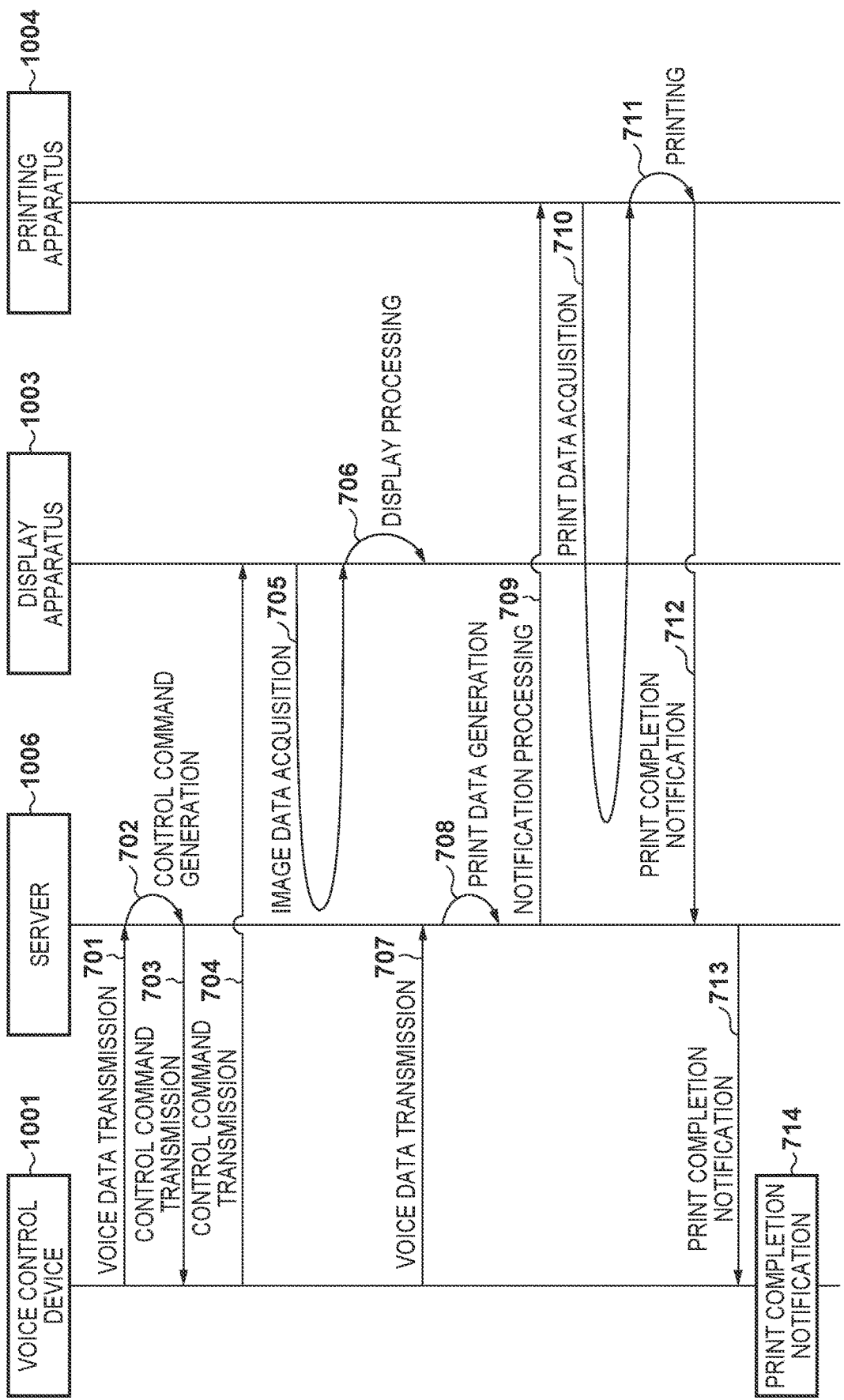
FIG. 7 is a sequence chart showing a sequence associated with print processing.

Processing of sending a print instruction to the printing apparatus 1004 via the voice control device 1001 will be described next with reference to FIG. 7. FIG. 7 is a sequence chart for explaining processing for causing the voice control device 1001 to make the printing apparatus 1004 execute print processing based on a print instruction by a voice uttered from the user. The function corresponding to this processing is implemented when the CPU of each device executes a corresponding program. Note that the display apparatus 1003 has already signed in to the server 1006. In addition, image data corresponding to a photo A to be described later is saved for the user by the server 1006.

Near the voice control device 1001, the user utters a wake word that is a predetermined keyword first and then utters what the user himself/herself wants to do. For example, the user utters the wake word and then utters "display the photo A". The voice control device 1001 receives the voice of the wake word, thereby receiving the voice uttered next. That is, the voice control device 1001 receives the voice "display the photo A". The voice control device 1001 transmits the identification information (for example, the Mac address) of the voice control device 1001 and voice data based on the received voice to the server 1006 (process 701).

The server 1006 specifies, from the Mac address of the voice control device 1001, the user ID associated with the Mac address, thereby recognizing that the voice control device 1001 is a device that has already signed in. The above-described access token may be used. The server 1006 analyzes the voice data transmitted from the voice control device 1001, generates a control command based on the voice data (process 702), and transmits the control command to the voice control device 1001 (process 703). Note that the control command includes a display processing command as processing contents to be executed and information representing the storage location of image data corresponding to the photo A as the display target.

The voice control device 1001 selects the transmission target of the control command received from the server 1006. Here, since the user utters "display the photo A" as the request from the user, the voice control device 1001 selects the display apparatus 1003 as the transmission destination. The voice control device 1001 transmits the control command to the selected display apparatus 1003 (process 704). Note that although the voice control device 1001 transmits the control command received from the server 1006 in the process 704, another command may be transmitted. That is, the voice control device 1001 may generate another command based on the control command received in the process 703 and transmit the other generated command to the display apparatus 1003. The process in which the voice control device 1001 transmits a control command is described even in the following description (for example, the process 704 in FIG. 10 and the like). Another command generated based on the control command may be transmitted similarly. In this case, the device that has received the command can execute processing according to the other command.

The display apparatus 1003 executes processing according to the control command. The display apparatus 1003 first accesses the storage location included in the control command and acquires image data corresponding to the photo A from the storage location (process 705). Then, the display apparatus 1003 displays image data A corresponding to the photo A (process 706). Note that if a URL corresponding to the photo A is included in the control command, the display apparatus 1003 may access the URL, thereby displaying a web page including the photo A.

In a state in which the image data corresponding to the photo A is displayed on the display apparatus 1003, near the voice control device 1001, the user utters the wake word first and then utters what the user himself/herself wants to do. For example, the user utters the wake word and then utters "print the photo A displayed on the display apparatus 1003".

The voice control device 1001 receives the voice of the wake word, thereby performing reception of the word uttered next. That is, the voice control device 1001 receives the voice "print the photo A displayed on the display apparatus 1003", thereby receiving a print instruction by the voice. The voice control device 1001 transmits the voice data to the server 1006 (process 707). Note that the basic process is the same as the process 701.

The server 1006 analyzes the voice data transmitted from the voice control device 1001 and executes processing based on the voice data. Here, since the voice data of the voice "print the photo A displayed on the display apparatus 1003" is received, the server 1006 generates print data based on the image data corresponding to the photo A (process 708).

Note that if the print instruction from the user is a simple instruction "print the photo A displayed on the display apparatus 1003" described above, pieces of information (set values) concerning a print setting are not included. That is, the set values of the number of pages, the print size, the orientation of printing, the page layout (page allocation), double-sided/single-sided printing, and the like needed when the printing apparatus 1004 prints the photo A are not included in the instruction. In this embodiment, if the set values are not included in the voice data as the result of voice data analysis, the voice control device 1001 uses predetermined set values as the set values of the image. Details will be described later with reference to FIGS. 9A and 9B.

Additionally, in this embodiment, as the process 708, another server different from the server 1006 may generate print data. For example, the manufacturer of the printing apparatus 1004 may provide a print server including software configured to generate print data. The server 1006 may request the print server to generate print data, and the print server may generate print data.

When the generation of print data is completed, the server 1006 transmits a notification representing that the generation of print data is completed to the printing apparatus 1004 (process 709). Upon receiving the notification representing that the generation of print data is completed, the printing apparatus 1004 accesses the server 1006, acquires the print data (process 710), and executes printing (process 711).

When the print processing is completed, the printing apparatus 1004 transmits a print completion notification to the server 1006 (process 712), and the server 1006 transmits the print completion notification to the voice control device 1001 (process 713). Upon receiving the print completion notification, the voice control device 1001 notifies the print completion by voice (process 714).

Arrangement of Server 1006

Figure 8:
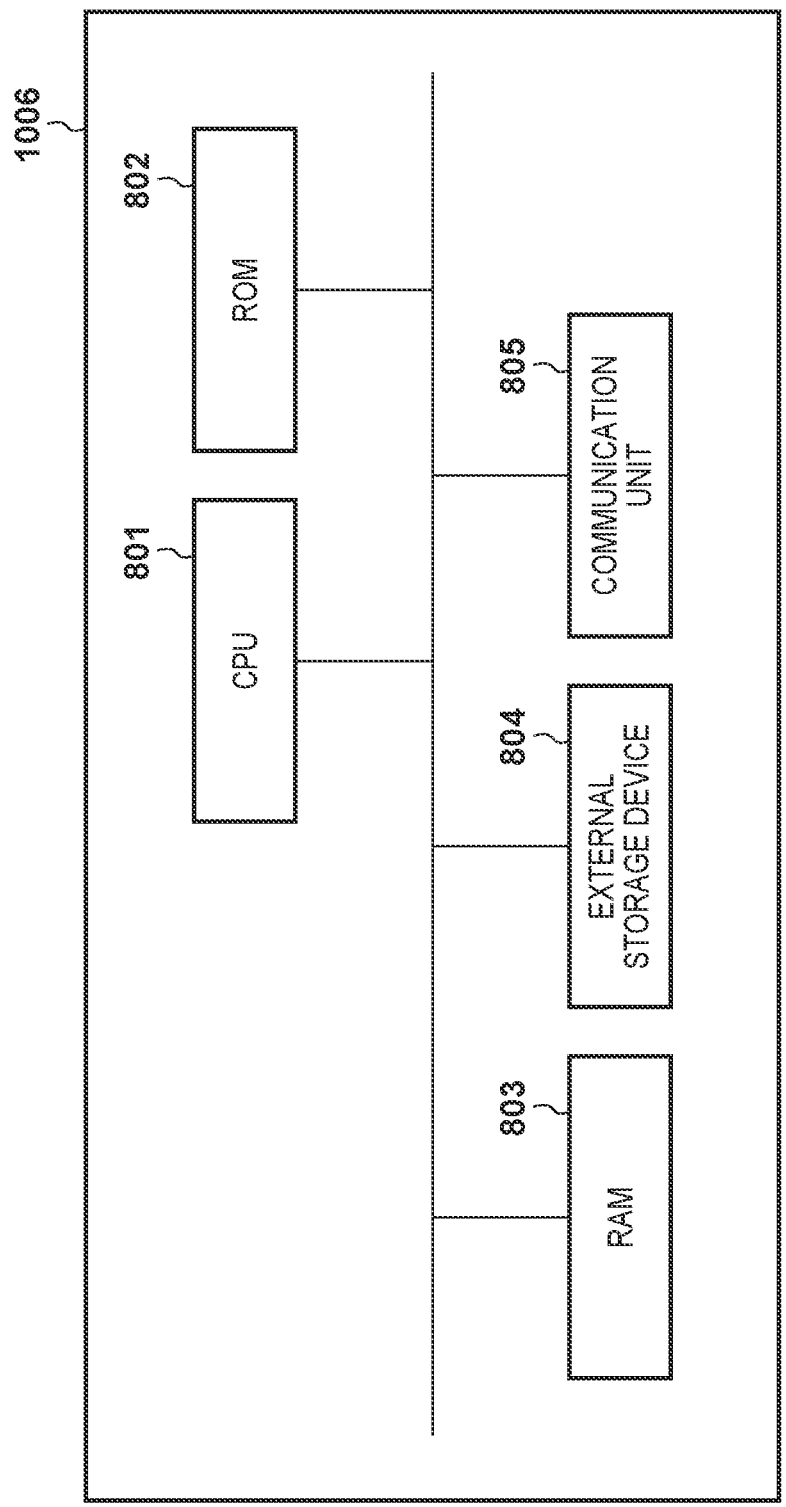
FIG. 8 is a block diagram showing the hardware arrangement of a server.

FIG. 8 is a block diagram showing the hardware arrangement of the server 1006. The server 1006 is an information processing apparatus including a CPU 801, a ROM 802, a RAM 803, an external storage device 804, and a communication unit 805. The CPU 801 is a system control unit and controls the entire server 1006. Note that in this embodiment, the server 1006 is formed by one server. However, a server system corresponding to the server 1006 may be formed by causing a plurality of information processing apparatuses to cooperatively operate. The ROM 802 stores fixed data such as control programs to be executed by the CPU 801, data tables, and an embedded OS (Operating System) program. The RAM 803 can store data such as a program control variable without volatilizing it because the data is held by a primary battery (not shown) for data backup. The external storage device 804 stores application software. Note that in FIG. 7, the server 1006 generates print data, as described above. For this reason, the external storage device 804 of the server 1006 stores print software that generates print data interpretable by the printing apparatus 1004. The communication unit 805 includes a circuit and an antenna configured to perform communication in accordance with a predetermined wireless communication method.

Details of Processing of Voice Control Device 1001 and Server 1006

Processing of the voice control device 1001 and the server 1006 in a case in which a print instruction is performed will be described next with reference to FIG. 9A. The flowchart of FIG. 9A corresponds to the processes 707 to 714 in FIG. 7. Note that in the voice control device 1001, when the CPU 103 loads a program concerning the processing of the flowchart from a memory such as the ROM 104 and executes the program, the processing of the voice control device 1001 is executed. On the other hand, in the server 1006, when the CPU 801 loads a program concerning the processing of the flowchart from a memory such as the ROM 802 and executes the program, the processing of the server 1006 is executed.

The CPU 103 inputs words (voice) uttered by the user on the periphery of the voice control device 1001 (step S901) and generates voice data based on the input voice. Then, the voice data is transmitted from the voice control device 1001 to the server 1006 (step S902).

Upon receiving the voice data, the CPU 801 analyzes the voice data and specifies the request of the user. The server 1006 receives, for example, voice data corresponding to a user request "print the photo A displayed on the display apparatus 1003" and determines whether the pieces of information (set values) concerning a print setting are included in the voice data (step S903).

If the pieces of information concerning the print setting are included in the voice data, the CPU 801 acquires the pieces of information concerning the print setting included in the voice data (step S904). On the other hand, if the pieces of information concerning the print setting are not included in the voice data, the CPU 801 acquires pieces of information concerning a predetermined print setting (step S905). Here, as the predetermined set values, set values registered in the server in advance are acquired.

In step S906, the CPU 801 specifies image data corresponding to the photo A displayed on the display apparatus 1003 based on the voice data and generates print data based on the image data by applying the pieces of information concerning the print setting acquired in step S904 or S905.

Next, the CPU 801 selects a printer to execute print processing (step S907). In this embodiment, the CPU 801 specifies a user ID associated with the Mac address of the voice control device 1001. Then, the server 1006 specifies the printing apparatus 1004 managed in association with the user ID. With the above-described processing, step S907 is implemented.

The CPU 801 transmits, to the printing apparatus 1004, a notification representing that the generation of print data is completed for the printer (printing apparatus 1004) selected in step S907 (step S908). After that, the printing apparatus 1004 accesses the server 1006 and acquires the print data, thereby executing print processing. The CPU 801 determines whether a print completion notification is received from the printing apparatus 1004 (step S909).

Upon receiving the print completion notification from the printing apparatus 1004 in step S909, the CPU 801 transmits the print completion notification to the voice control device 1001 that is the print instruction source. Upon receiving the print completion notification, the CPU 103 notifies the print completion by voice. More specifically, the CPU 103 converts the print completion notification into a voice and outputs the print completion by voice using the speaker 102.

With the above-described processing, the user can print a desired photo by a simple operation. In particular, even if an instruction concerning the print setting is not included in the instruction by the voice of the user, print data is generated by applying predetermined set values.

Modification

In this embodiment, if the pieces of information concerning the print setting are not included in the voice data, the user may be confirmed to print using the predetermined set values. More specifically, if the server 1006 determines in step S903 that the pieces of information concerning the print setting are not included in the voice data, the server 1006 generates a control command used to notify the voice control device 1001 that printing is performed using the predetermined set values. Then, the server 1006 transmits the control command to the voice control device 1001. In accordance with the received control command, the voice control device 1001 notifies the user by voice that printing is performed using the predetermined set values. For example, a voice "one copy of the photo A will be printed on photo paper with an L size under settings . . . (omit) . . . " is output. Note that the items of the print setting necessary for print data generation include a plurality of items. Hence, if all the items are output by voice, the time until the user acquires desired information becomes long. Hence, the print setting items to be output by voice may be only some representative setting items.

Alternatively, the user may be asked whether printing may be performed using predetermined set value by a question-type voice "one copy of the photo A will be printed on photo paper with an L size under settings ... (omit).... Is it OK?". In the case of the question-type voice, the print setting may be determined or changed upon receiving a response from the user to the question. That is, if a reply to approve the print setting (for example, a reply "OK") is received from the user, the voice control device 1001 transmits the voice data to the server 1006, and the server 1006 determines the print setting. On the other hand, if a reply to instruct different print setting (for example, a reply "print two copies") is received from the user, the voice control device 1001 transmits the voice data to the server 1006. The server 1006 changes only the item of the number of copies instructed to be changed from, for example, "1" to "2". Note that if a change of a print setting is received, the server 1006 may cause the voice control device 1001 to notify the user, by voice, of the set value after the change.

The user may be notified of the set values not by voice but by display. That is, the server 1006 may transmit a control command to the display apparatus 1003 and cause the display apparatus 1003 to display set values to be applied. This allows the user to easily grasp what kind of print setting is used to do printing. Note that the print setting may be changeable by the user on a screen displayed on the display apparatus 1003. More specifically, the server 1006 holds the data of a print setting screen. The display apparatus 1003 acquires the screen data of the print setting from the server 1006, thereby displaying the print setting screen. This allows the user to do print setting while viewing the screen.

In addition, the items of print setting necessary for the server 1006 to generate print data include a plurality of items, as described above. FIG. 13 shows the items of a print setting. When there are many print setting items, the user may designate only some setting items by voice. More specifically, only representative setting items may be instructed by uttering, for example, "print one copy of the photo A in the L size". Hence, in this embodiment, it may be confirmed for each necessary print setting item whether the information is included in the voice data, and a predetermined set value may be applied only for an item that is not included. The procedure of this processing will be described with reference to FIG. 9B.

Figure 9A:
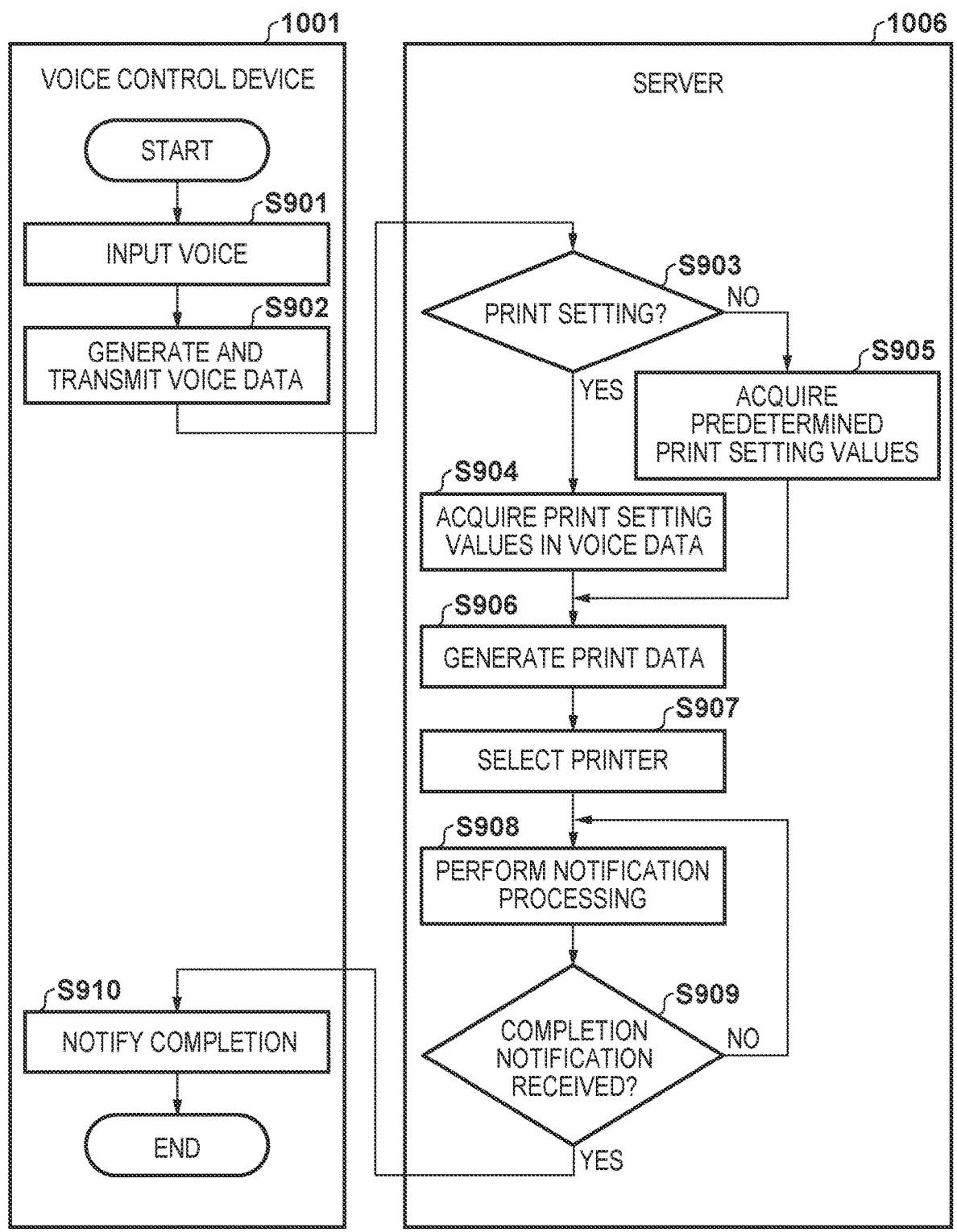
FIGS. 9A and 9B are flowcharts showing the processing of the voice control device and the server.
Figure 9B:
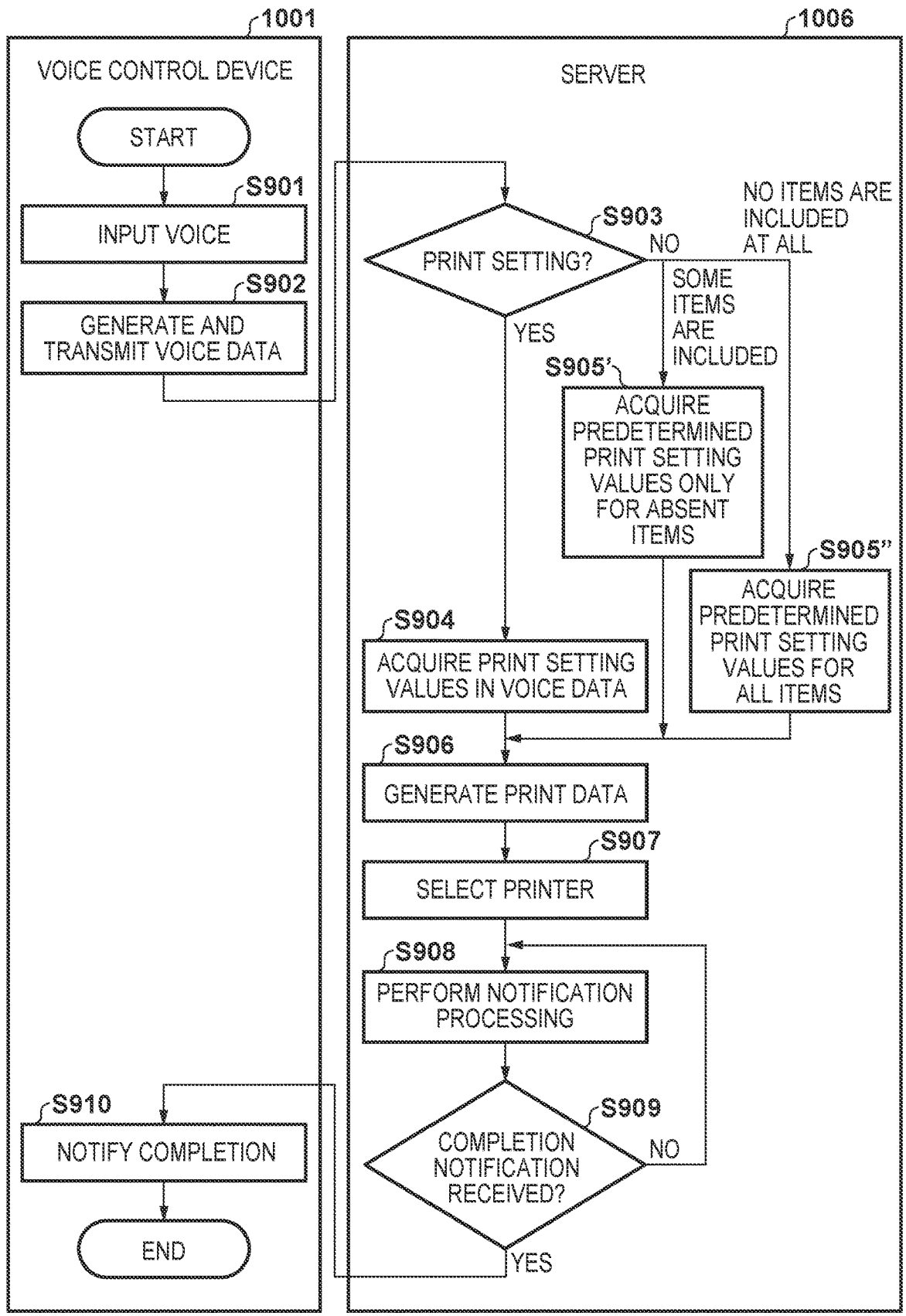

Referring to FIG. 9B, the processes of steps S901 and S902 are the same as in FIG. 9A. In step S903, when determining whether the pieces of information concerning the print setting are included in the voice data, the CPU 801 determines whether all the necessary print setting items are included. That is, print setting items included in the voice and print setting items that are not included are specified. If all items are included in the voice data, the CPU 801 acquires the pieces of information concerning the print setting in the voice data (step S904), as in FIG. 9A. On the other hand, if some print setting items are not included in the voice data, the CPU 801 acquires predetermined set values registered in advance only for the items (absent items) that are not included and, for the items included in the voice data, acquires the information from the voice data (step S905'). In addition, if the pieces of information concerning the print setting are not included in the voice data at all, the CPU 801 acquires predetermined set values registered in advance for all the items (step S905"). The subsequent processing is the same as in FIG. 9A, and a description thereof will be omitted. With this processing, it is also possible to cope with a case in which the user instructs only some print setting items.

Additionally, as shown in FIG. 14, the server 1006 according to this embodiment may have a plurality of print settings as the predetermined print settings. More specifically, different print settings are preferably provided in accordance with the data type of a print target. For example, a preferable setting or a general setting changes between a photo and a document (a document created by a document creation application such as Microsoft Word). Hence, a plurality of print settings that are different depending on the data type are registered in the server 1006. If instructions concerning the print setting are not included in the voice data in step S903, the server 1006 identifies the data type of the print target. The identification can be performed based on, for example, the extension of a data file. Based on the identification result, a print setting corresponding to the identified data type is acquired from the memory of the server 1006. For example, if the data type is "photo", "print setting 1" is selected. If the data type is "document", "print setting 2" is selected.

Furthermore, the server 1006 according to this embodiment may have a plurality of print settings independently of the data type. For example, assume that the user instructs "print a document B on fine art paper" by voice. In this case, the user is assumed to place importance on fine printing rather than the print speed. However, "print setting 2" that is a print setting for a document in FIG. 14 defines "print quality: standard", "double-sided/single-sided setting: double-sided setting", and "page layout: 2 pages/sheet". Hence, if the uninstructed print setting items are directly applied, a printing result different from that assumed by the user may be obtained. To prevent this, the server 1006 according to this embodiment has a plurality of print settings, in which at least some items have different set values, in correspondence with one data type. In particular, a plurality of print settings in which the print quality, color setting, double-sided/single-sided setting, and the like are different may be provided in accordance with the paper type. For example, in addition to the print settings 1 and 2 shown in FIG. 14, "print setting 3" in which "paper type: fine art paper", "print quality: fine", "double-sided/single-sided setting: single-sided printing", and "page layout: 1 pages/sheet" are registered is provided as another print setting "for document". When the plurality of print settings are registered in this way, even if the user instructs "print the document B on fine art paper", the server 1006 can select and acquire "print setting 3" having set values corresponding to this. Note that instead of referring to the data type, the print setting may be provided for each paper type simply based on the information of paper type included in the voice instruction. As described above, even if the user instructs only some print setting items, the server 1006 can select a print setting including setting information corresponding to the instruction from a plurality of registered print settings. It is therefore possible to generate print data more according to the user's intention.

Additionally, in this embodiment, the registered values of the "predetermined print setting" may be changeable by a user instruction. The predetermined print setting is determined in accordance with the printing apparatus 1004 or the server 1006 to sign in. A default print setting is registered as an initial setting unless the print setting is changed. To change the default print setting, the user instructs, by voice, the voice control device 1001 to send voice data to the server 1006, and the print setting in the server 1006 is changed. The print setting in the server 1006 may be changed via a terminal apparatus such as the portable terminal 1002.

In addition, when the voice control device 1001 can specify the name of the user who has requested printing from the voice "print the photo A displayed on the display apparatus 1003", voice data may be generated by adding the user name. With this processing, for example, the printing apparatus 1004 can display the user name during execution of the print processing 711 or as a print history.

In addition, after the print completion is notified and before printing using another print data is instructed, near the voice control device 1001, the user utters the wake word first and then utters what the user himself/herself wants to do, thereby reflecting the contents. For example, the user utters the wake word and then utters a copy addition instruction such as "one more copy" or "additionally print three copies".

Upon receiving the copy addition instruction, the voice control device 1001 may transmit the voice data transmitted in the process 707 again. At this time, voice data corresponding to "one more copy" or "additionally print three copies" is also transmitted together. The server 1006 receives the two pieces of voice data, thereby performing the same print data generation processing as in the process 708. The server 1006 sets the number of copies based on the voice data of the new request. With this processing, the user can easily instruct re-printing using the same image data.

Furthermore, after the print completion is notified and before printing using another print data is instructed, near the voice control device 1001, the user utters the wake word first and then utters what the user himself/herself wants to do, thereby reflecting the contents. For example, the user utters the wake word and then utters "print on a larger sheet". Upon receiving the instruction, the voice control device 1001 may transmit the voice data transmitted in the process 707 again. At this time, voice data corresponding to "print on a larger sheet" is also transmitted together. The server 1006 receives the two pieces of voice data, thereby performing the same print data generation processing as in the process 708. The server 1006 sets the paper size based on the voice data of the new request. With this processing, the user can easily instruct to print the same image data on a sheet of a different size. Note that when another device, for example, the voice control device 1001 or the display apparatus 1003 generates print data, as will be described later, the device that generates print data may perform the same processing.

In addition, if an instruction associated with the print speed is included in the instruction by voice, the server 1006 may change the print setting to be applied based on the instruction. More specifically, when an instruction "print quickly" is received from the user, the server 1006 determines that printing needs to be completed quickly and changes the setting such that printing is performed in a speed priority mode. More specifically, even if the item of "print quality" in the registered print setting is a set value corresponding to "fine", it is changed to a set value corresponding to "standard".

In addition, the server 1006 may analyze the set values in a print instruction received in the past, thereby reflecting the user's preference concerning the print setting. More specifically, in a case in which the user often uses a setting to allocate two pages to one sheet a predetermined number or more of times in a past predetermined period, this setting may be reflected even if the set value of the page layout registered by default is a setting to allocate one page to one sheet. That is, the registered set value of the item of the page layout is changed to a set value corresponding to "two pages/sheet".

In addition, the printing apparatus 1004 or the server 1006 may include a memory that saves a voice keyword concerning printing. The voice control device 1001 downloads the voice keyword from the printing apparatus 1004 or the server 1006. Since the voice control device 1001 can thus correctly interpret the voice of the user concerning a print instruction to generate voice data, the voice control device 1001 becomes more familiar with terms concerning printing and can execute printing more conforming to the user's intention.

For example, the CPU 407 of the printing apparatus 1004 or the CPU 801 of the server 1006 stores words concerning a print instruction in the ROM 405 or the ROM 802. If a new executable function or item is available in accordance with the upgrading of the firmware of the printing apparatus 1004, the words concerning printing may also be updated. For example, the printing apparatus 1004 newly registers, in the memory, words used anew on a user interface screen such as a main menu screen or a setting screen corresponding to the new function. At this time, voice information such as a frequency, speed, and intonation may also be stored as standard feature amounts serving as a model together with the words.

Case in Which User Inquires about Setting Value Settable in Print Setting

In this embodiment, a method of notifying the user of a settable set value by voice output from the voice control device 1001 will be described below.

Figure 15:
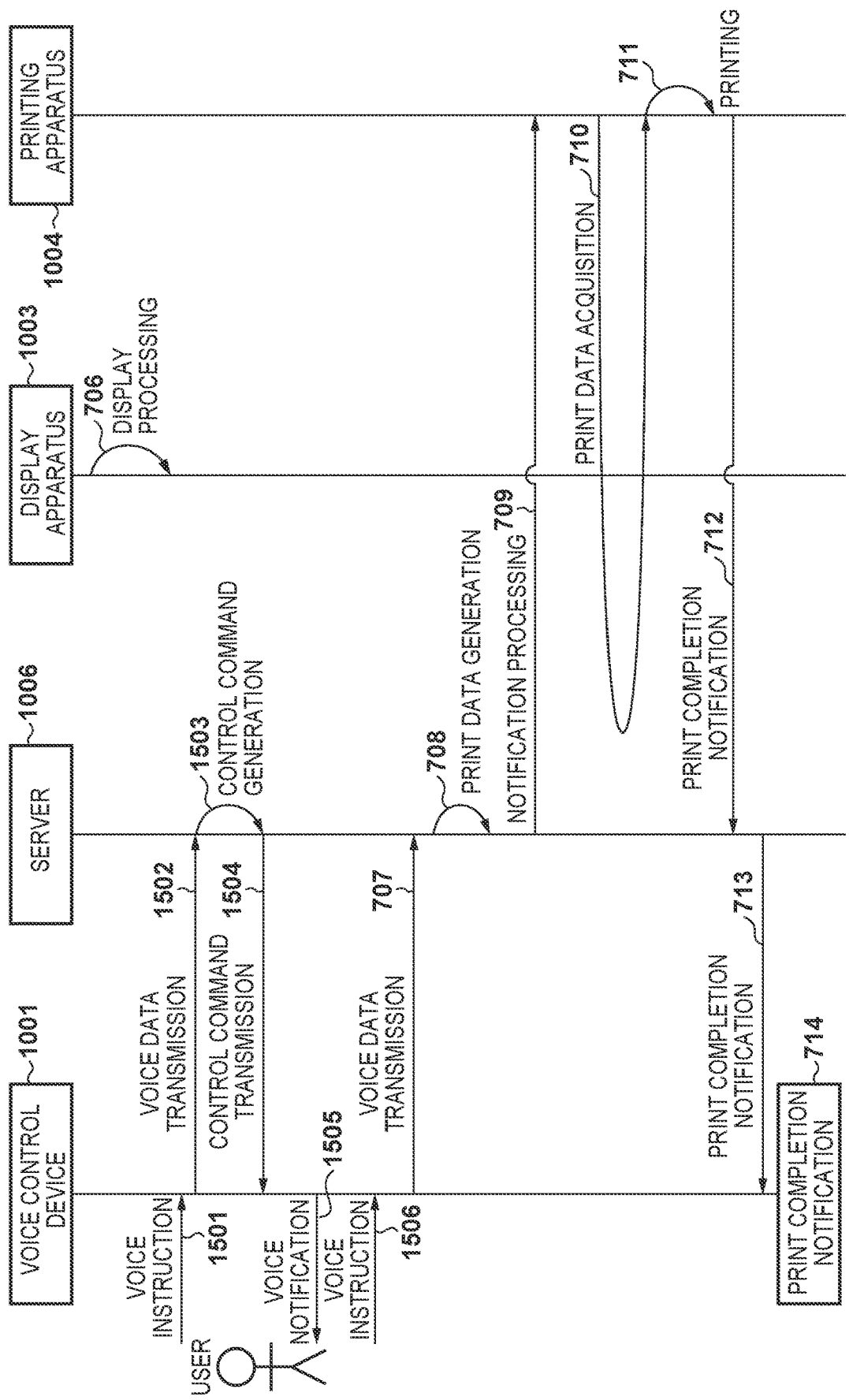
FIG. 15 is a sequence chart showing a sequence associated with print processing.

FIG. 15 is a sequence chart in a case in which the user inquires of the voice control device about a set value settable in a print setting. Note that a description of portions common to FIG. 7 used in the description of a case in which no query is done will be omitted, and portions different from FIG. 7 will mainly be described below.

The processes 701 to 706 are the same as in FIG. 7. In FIG. 15, the processes 701 to 705 are not illustrated, and processing from the process 706 is illustrated. After the user confirms image data displayed on the display apparatus 706, the voice control device 1001 receives a voice instruction to inquire about a set value settable in the printing apparatus 1004 (process 1501).

The voice instruction is, for example, "tell me settable paper sizes" next to the wake word. The voice control device 1001 recognizes the voice instruction and transmits voice data to the server 1006 (process 1502). The server 1006 analyzes received voice data and generates a control command to be executed by the voice control device 1001 (process 1503). The control command includes the information of setting item data in the printing apparatus 1004 and a voice output processing command as processing contents to be executed by the voice control device. Details of the setting item data to be included will be described later.

After that, the server 1006 transmits the generated control command to the voice control device 1001 (process 1504). Upon receiving the control command, the voice control device 1001 outputs set values settable in the printing apparatus 1004 by voice from the speaker 102 based on the command to make a notification to the user (process 1505). For example, the voice control device 1001 outputs "the paper size can be selected from A4, B5, letter, and L size" by voice. The user listens to the notification and utters a print instruction by voice (process 1506). In this sequence chart, the query is done only once. However, the query may be done a plurality of times.

Figure 16:
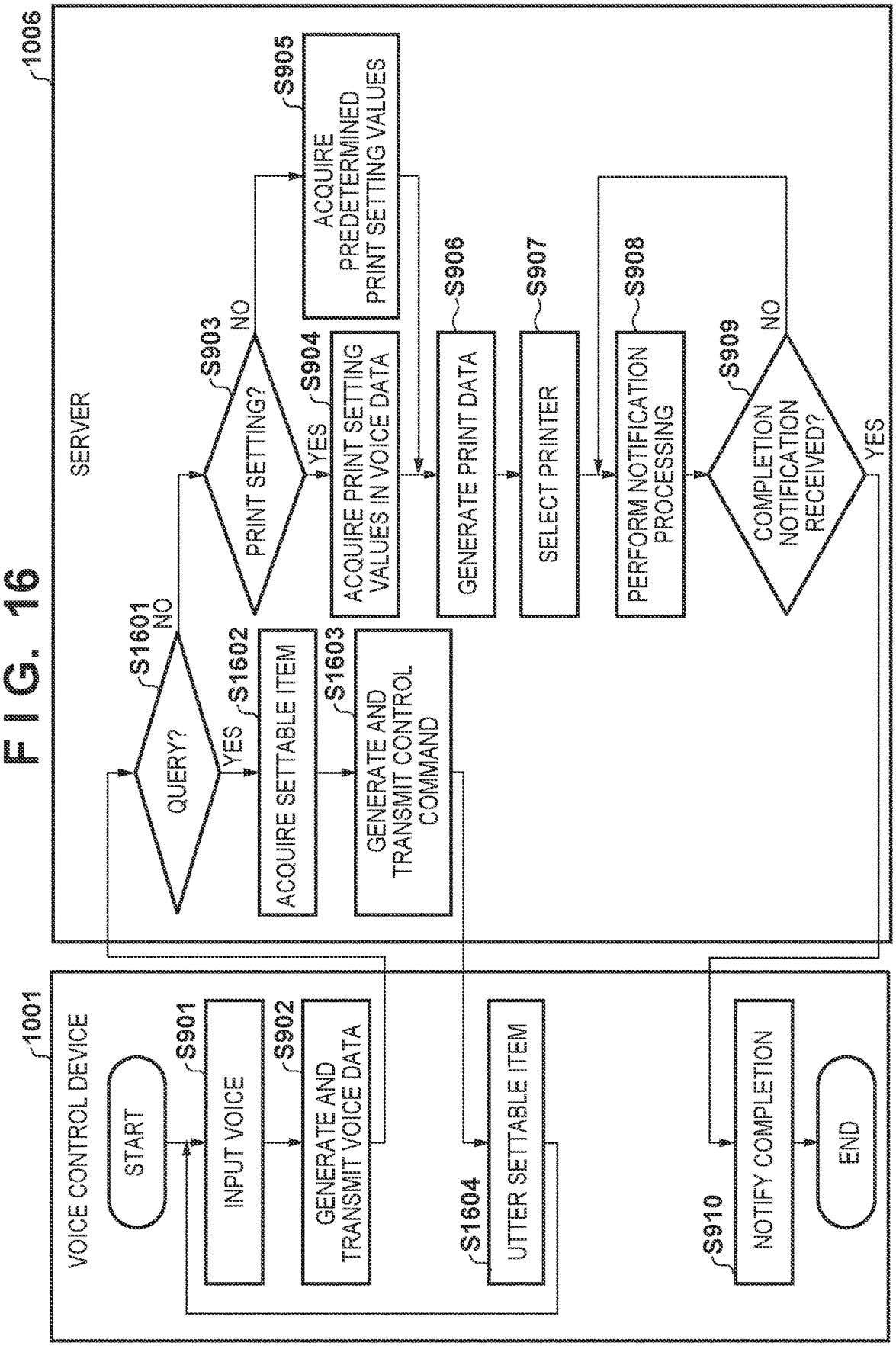
FIG. 16 is a flowchart showing the processing of the voice control device and the server.

FIG. 16 is a flowchart showing an example of the processing of the voice control device 1001 and the server 1006 for the control as shown in FIG. 15. A description of portions common to FIG. 9A used in the description of a case in which no query about set values is made to the voice control device 1001 will be omitted, and portions different from FIG. 9A will mainly be described below.

Upon receiving voice data transmission (process 1502) from the voice control device 1001, the server 1006 determines whether the voice data is the voice data of a query in step S1601. As for the determination method, the determination is done based on whether a specific word is included in the voice data. The specific word is, for example, "tell" or "what". The specific word may be stored in, for example, the ROM 802 of the server 1006 in advance. However, the user does not necessarily clearly utter the specific word itself. Hence, the CPU 801 of the server 1006 may perform similarity analysis between the specific word and a word recognized from the voice data. As the similarity analysis, for example, a standard feature amount (model) of the specific word and a feature amount acquired from the word recognized from the voice data may be compared for each component, and it may be determined whether the difference falls within a predetermined range. Here, the components of the feature amount are, for example, the frequency, speed, and intonation.

The server 1006 may acquire the standard feature amount of the specific word by learning and store it in the ROM 802 or the like. For example, the server 1006 may analyze the feature amount of the specific word uttered by an unspecified large number of people and decide the standard feature amount based on the analysis result. The analysis at this time may be, for example, regression analysis or an analysis to calculate an average. The arrangement for performing such learning may be provided not in the server 1006 but in another server. In addition, every time voice data is received from the voice control device 1001, the standard feature amount may be acquired in addition to the already learned word. This can improve the accuracy of the learning result.

Upon determining in step S1601 that the voice data is not a query, it is a print instruction and, therefore, the process advances to step S903. Upon determining that the voice data is a query, pieces of information (values) concerning a print setting registered in the server 1006 are loaded in step S1602. More specifically, the values are set values settable in the printing apparatus 1004. In step S1603, a control command for the voice control device 1001 concerning the loaded set values settable in the print setting is generated and transmitted. In step S1604, the speaker 102 outputs a voice based on the received control command.

Control command generation/transmission (process 1504) by the server 1006 to the query of the voice data will specifically be described below. The control command may be generated such that all set values matching the contents of the query of the voice data may sequentially be output from the voice control device 1001 by voice. However, if the order of a set value desired by the user is later, the user needs to wait until the desired set value is output by voice. For example, this will be described using the above-described example. Although "the paper size can be selected from A4, B5, letter, and L size", if the user wants to know whether printing can be performed in "L size", he/she needs to wait until "L size" is notified. Hence, in this embodiment, the set values are output by voice in descending order of use frequency based on the user's use history of information concerning a print setting in the past. Alternatively, only a set value of a high use frequency may be specified and output by voice.

For example, the server 1006 may have a database of the use history of information concerning a print setting corresponding to each user. The control command may be generated such that a set value of a high use frequency is preferentially output by voice from the database of the user corresponding to the voice data received from the voice control device 1001. Alternatively, the control command may be generated such that a set value of a high use frequency is preferentially output by voice from a database corresponding to all users who use the printing apparatus 1004. In addition, the database provided in the server 1006 need not always correspond to each user. For example, the database may correspond to each department that uses the printing apparatus 1004. Note that the example in which a set value of a high use frequency is preferentially output by voice means that a set value of a high use frequency is output first, and other set values are sequentially output by voice.

In addition, the control command may be generated such that a set value that enables preferable printing by the printing apparatus 1004 is preferentially output by voice based on the image data displayed on the display apparatus 1003. For example, if the number of pixels of the displayed image data is large, it may be determined that fine printing is desired, and the control command may be generated such that L size is output first by voice. At this time, the server 1006 may analyze the correlation between various kinds of feature amounts of the image data and various kinds of print settings based on the past print history. For example, if the correlation between a predetermined number of pixels of image data and the print size (L size or the like) is higher than a predetermined value (a print count under the condition is a predetermined number or more), it is inferred that the set value is a set value preferred by the user, and the set value is preferentially output by voice. Alternatively, set values used in the printing 711 and the feature amount of the image data displayed on the display apparatus 1003 at that time may be registered newly as a print history and used in analysis and inference later.

In addition, the voice instruction 1501 may be not only a query concerning a set value for a print setting but also a query concerning processing contents executable by the printing apparatus 1004 or a setting item of the main body. For example, the voice instruction may be a query concerning an executable maintenance instruction or a remaining amount of ink.

In the above-described example, an example in which after the user confirms the image, a notification of processing settable/executable by the printing apparatus 1004 can be received by voice has been described. Instead of making a notification by voice to the user, the set value may be displayed on the display apparatus 1003 to notify the user. In this case, in the processes 1503 and 1504, a control command for the display apparatus 1003 is generated, and the control command is transmitted to the display apparatus 1003. The display apparatus 1003 displays a set value based on the received control command. When transmitting the control command to the voice control device 1001, the order of voice output is changed to a priority order. In the display on the display apparatus 1003, the display order is changed to, for example, a priority order from above. Alternatively, the display form of a set value of a high priority order may be changed such that the set value is, for example, highlighted.

In addition, the set value may be displayed on the display unit 408 of the printing apparatus 1004. In this case, in the processes 1503 and 1504, a control command for the printing apparatus 1004 is generated, and the control command is transmitted to the printing apparatus 1004. The printing apparatus 1004 displays a set value on the display unit 408 based on the received control command. Additionally, in FIG. 15, the query of the process 1501 is performed after the display processing 706 but may be performed before the display processing 706.

Second Embodiment

The second embodiment will be described next. In the first embodiment, as described with reference to FIGS. 7 and 9, a form in which the server 1006 generates print data, and the printing apparatus 1004 performs printing using a notification from the server 1006, which represents that the generation of print data is completed has been described. In this embodiment, a form in which a voice control device 1001 generates print data will be described. Note that a description of portions common to the first embodiment will be omitted, and portions different from the first embodiment will mainly be described below.

Figure 10:
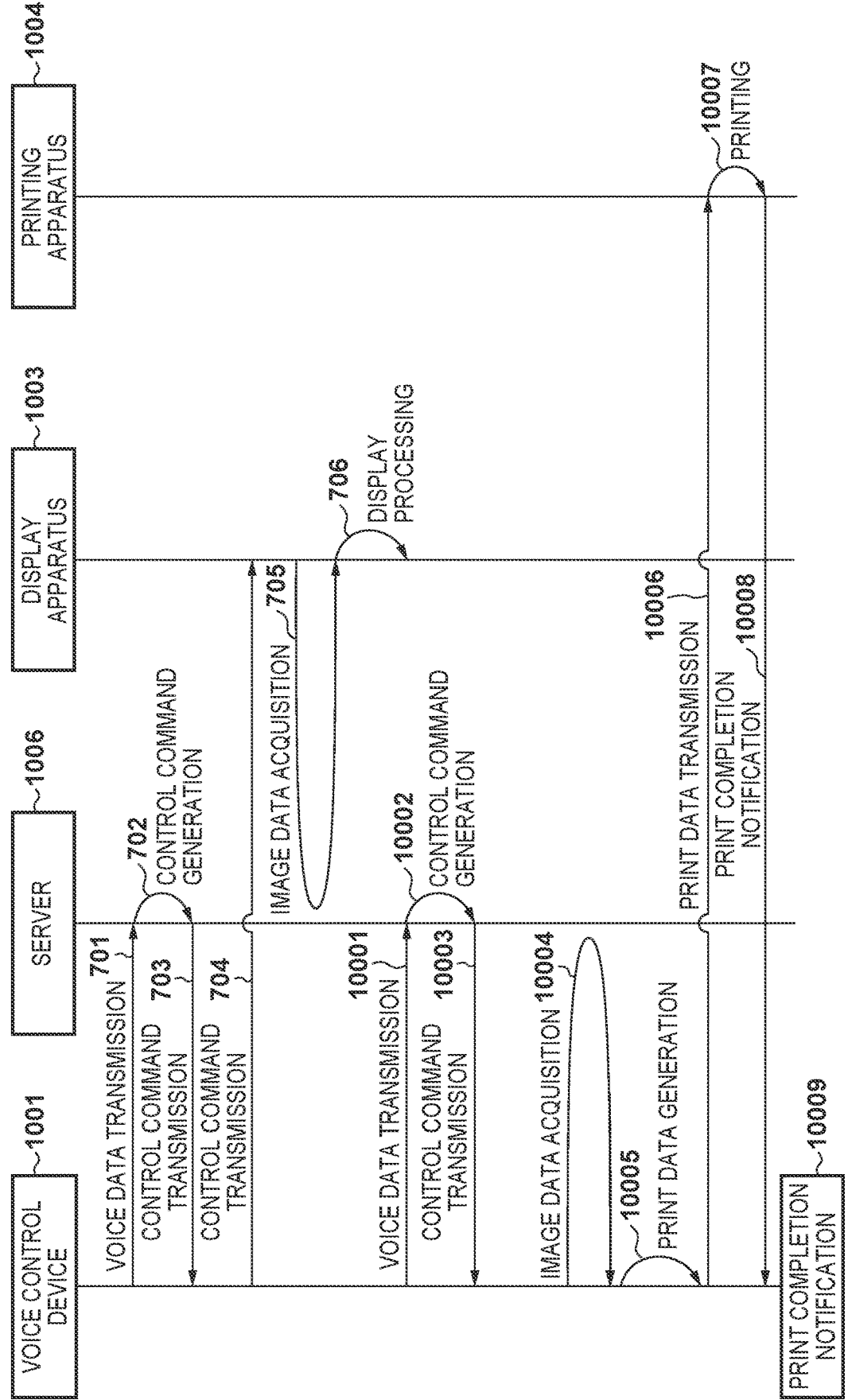
FIG. 10 is a sequence chart showing a sequence associated with print processing.

FIG. 10 is a sequence chart for explaining print processing. Note that processes 701 to 706 are the same as in FIG. 7, and a detailed description thereof will be omitted. Additionally, in FIGS. 10 and 11, the voice control device 1001 generates print data. Hence, in this embodiment, an external storage device 107 of the voice control device 1001 stores print software that generates print data interpretable by a printing apparatus 1004, information necessary for communication, and the like.

The voice control device 1001 receives the voice of a wake word, thereby receiving a word uttered next. That is, the voice control device 1001 receives a voice "print a photo A displayed on a display apparatus 1003".

The voice control device 1001 transmits the voice data to a server 1006 (process 10001). The server 1006 analyzes the voice data transmitted from the voice control device 1001 and executes processing based on the voice data. The server 1006 receives the voice data of the voice "print the photo A displayed on the display apparatus 1003". For this reason, the server 1006 generates a control command to print image data corresponding to the photo A (process 10002).

The server 1006 transmits the control command generated in the process 10002 to the voice control device 1001 (process 10003). The voice control device 1001 executes processing according to the control command. Since an instruction to acquire and print image data corresponding to the photo A is included in the control command, the voice control device 1001 acquires the image data corresponding to the photo A from the server 1006 (process 10004).

The voice control device 1001 generates print data based on the acquired image data and print setting information (process 10005). Note that as in the first embodiment, if the print instruction from the user is a simple instruction "print the photo A displayed on the display apparatus 1003", pieces of information concerning a print setting are not included. Hence, in this embodiment as well, if the pieces of information concerning a print setting are not included in the instruction by voice, predetermined set values are used as the set values of the image, as in the first embodiment. More specifically, if the pieces of information concerning the print setting are not included in the control command, the voice control device 1001 generates print data by applying predetermined set values registered in advance in the voice control device 1001. Note that whether the pieces of information concerning the print setting are included may be determined not by the voice control device 1001 but by the server 1006. In this case, the server 1006 determines whether the pieces of information concerning the print setting are included in the voice data from the voice control device 1001. If the pieces of information concerning the print setting are not included, a control command is generated by applying predetermined set values registered in advance in the server 1006. The voice control device 1001 can generate print data based on the set values included in the control command.

The voice control device 1001 transmits the print data generated in the process 10005 to the printing apparatus 1004 (process 10006). When print processing based on the print data is completed (process 10007), the printing apparatus 1004 transmits a print completion notification to the voice control device 1001 (process 10008). Upon receiving the print completion notification, the voice control device 1001 notifies the print completion by voice (process 10009).

Details of Processing of Voice Control Device 1001

Figure 11:
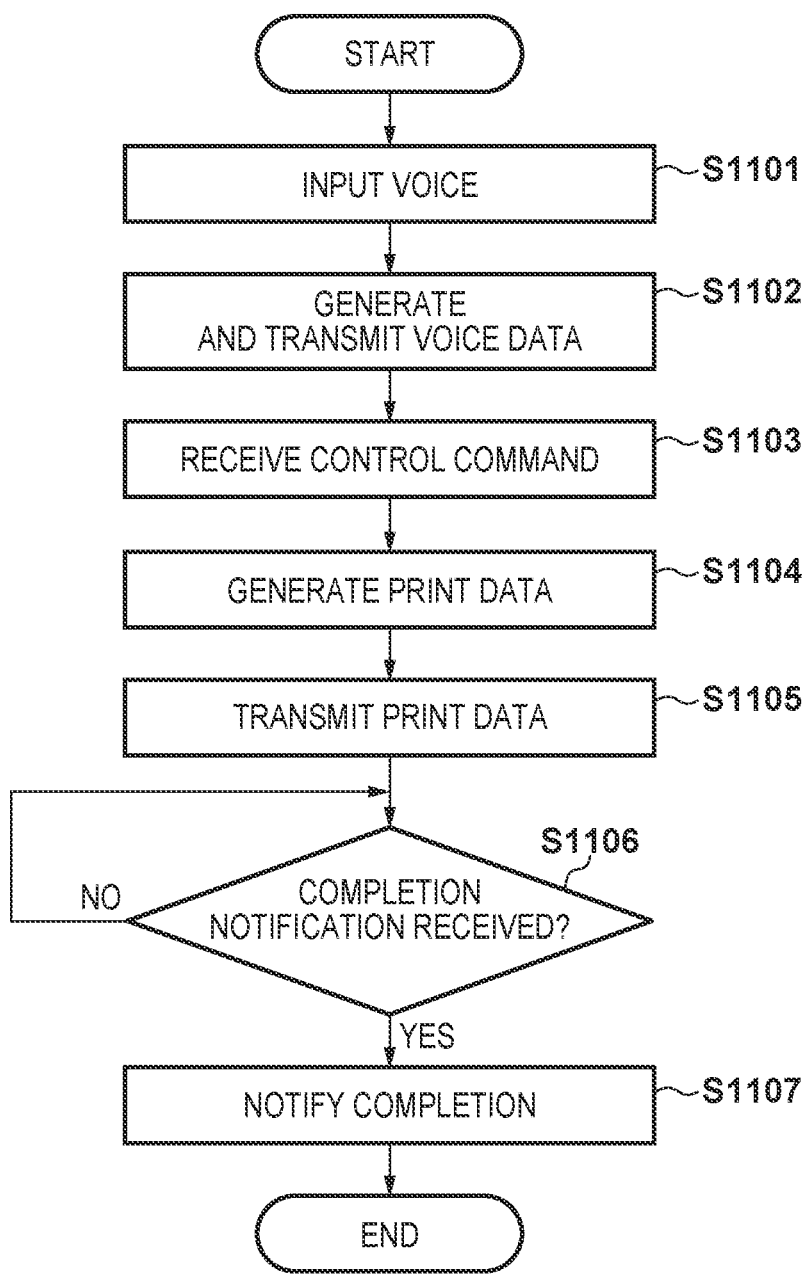
FIG. 11 is a flowchart showing the processing of the voice control device.

Processing of the voice control device 1001 will be described next with reference to FIG. 11. The flowchart of FIG. 11 corresponds to the processes 10001 to 10009 in FIG. 10. Note that steps S1101 and S1102 in FIG. 11 are the same processes as steps S901 and S902 in FIGS. 9A and 9B, and a detailed description thereof will be omitted.

A CPU 103 receives a control command from the server 1006 (step S1103). The CPU 103 analyzes the received control command and specifies processing to be executed next. The control command includes an instruction to acquire the image data of the photo A and a print instruction of the image data. Hence, the CPU 103 acquires the image data from the server 1006 and generates print data (step S1104). Note that in step S1104, as in the processing of the server 1006 in the first embodiment, it is determined whether pieces of information concerning a print setting are included in the instruction by voice from the user. If the pieces of information are not included, processing of applying predetermined number set values is performed. More specifically, the CPU 103 analyzes the control command and determines whether the pieces of information concerning the print setting are included in the control command. If the pieces of information concerning the print setting are included in the control command, the CPU 103 acquire the pieces of information concerning the print setting included in the control command. On the other hand, if the pieces of information concerning the print setting are not included in the control command, the CPU 103 acquires pieces of information concerning a predetermined print setting. Here, as the pieces of information concerning the predetermined print setting, pieces of information (values) concerning a print setting registered in advance in the voice control device 1001 are acquired. Then, print data is generated by applying the acquired pieces of information concerning the print setting.

Note that whether the pieces of information concerning the print setting are included may be determined not by the voice control device 1001 but by the server 1006. In this case, the server 1006 determines whether the pieces of information concerning the print setting are included in the voice data from the voice control device 1001. If the pieces of information concerning the print setting are not included, a control command is generated by applying predetermined set values registered in advance in the server 1006. Hence, the voice control device 1001 can generate print data based on the set values included in the control command.

The CPU 103 transmits the print data to the printing apparatus 1004 (step S1105). Here, the CPU 103 registers the display apparatus 1003 and the printing apparatus 1004 as the control target devices of the voice control device 1001 in accordance with an instruction input via a screen 507 shown in FIG. 5 described above. Hence, the CPU 103 decides the transmission destination of the print data to the printing apparatus 1004 in accordance with the registration. The CPU 103 determines whether a print completion notification is received (step S1106) and, upon receiving the print completion notification, notifies the print completion by voice (step S1107).

With the above-described processing, the user can print a desired photo by a simple operation. In addition, the load on the server 1006 can be reduced.

Note that an example in which pieces of information concerning a predetermined print setting are registered in the voice control device 1001 has been described above. However, the server 1006 may hold the pieces of information concerning the predetermined print setting. That is, the server 1006 determines whether pieces of information concerning a print setting are included in the voice data from the voice control device 1001 in the process 10001. Upon determining that the pieces of information concerning a print setting are not included in the voice data, the server 1006 includes, in the control command, pieces of information concerning a predetermined print setting registered in advance in the server 1006. Then, the server 1006 transmits the control command to the voice control device 1001. The voice control device 1001 generates print data in accordance with the received control command.

Additionally, in this embodiment as well, when the voice control device 1001 executes the processing associated with the print setting described in [Modification] of the first embodiment by replacing the server 1006, the same processing as in each example of [Modification] of the first embodiment can be executed. Even in a modification, a description of the same processes as in the first embodiment will be omitted, and portions different from the first embodiment will mainly be described below.

In this embodiment as well, if the pieces of information concerning the print setting are not included in the print instruction by voice, the user may be notified by voice that printing is performed using predetermined set values. More specifically, if the voice control device 1001 determines that the pieces of information concerning the print setting are not included in the print instruction by the voice of the user or the control command, the voice control device 1001 notifies the user by voice that printing is performed using predetermined set values. The server 1006 may determine whether the pieces of information concerning the print setting are included in the voice data and generate and transmit a control command to cause the voice control device 1001 to notify the user by voice that printing is performed using predetermined set values, as a matter of course. In addition, the user may be notified by a question-type voice, or the print setting may be determined or changed by receiving a reply from the user to the question, as in the first embodiment. Additionally, in this embodiment as well, the user may be notified of the set values not by a voice but by display. More specifically, a control command may be transmitted from the voice control device 1001 or the server 1006 to the display apparatus 1003, and the display apparatus 1003 may display the set values to be applied.

In addition, the voice control device 1001 or the server 1006 may confirm whether information is included in the instruction for each necessary item of the print setting. That is, the voice control device 1001 may generate print data by applying a predetermined set value registered in advance in the voice control device 1001 or the server 1006 for an item that is not included in the voice. Additionally, as shown in FIG. 14, the voice control device 1001 or the server 1006 may have a plurality of print settings. A predetermined print setting is selected from them based on the print instruction. In addition, a plurality of print settings may be provided for one data type. Furthermore, the predetermined print setting may be changeable by an instruction of the user.

In addition, when the voice control device 1001 can specify the name of the user who has requested printing from the voice "print the photo A displayed on the display apparatus 1003", voice data may be generated by adding the user name.

In addition, after the print completion is notified and before printing using another print data is instructed, the user inputs a copy addition instruction by voice, thereby enabling execution of re-printing using the same image data for the added copies. In addition, after the print completion is notified and before printing using another print data is instructed, the user may instruct a different print setting by voice, thereby enabling execution of re-printing of the different print setting using the same image data.

In addition, if an instruction associated with the print speed is included in the instruction by voice, the voice control device 1001 or the server 1006 may change the print setting to be applied based on the instruction. Furthermore, the voice control device 1001 or the server 1006 may analyze, for example, the set values in a print instruction received in the past predetermined period, thereby reflecting the user's preference concerning the print setting. That is, the registered value of a predetermined print setting may be changed based on the preference analysis result.

Case in Which User Inquires about Setting Value Settable in Print Setting

In the second embodiment, a case in which the user inquires about a settable set value will be described. As in the first embodiment, the display apparatus 1003 executes display processing in the process 706 of FIG. 10. After that, the voice instruction in the process 1501 to the voice notification in the process 1505 shown in FIG. 15 are performed, and the user is notified of the settable set value. Alternatively, the query of the set value may be made before voice data communication in the process 701.

Third Embodiment

The third embodiment will be described next. In this embodiment, a form in which a display apparatus 1003 generates print data will be described. Note that a description of portions common to the first embodiment will be omitted, and portions different from the first embodiment will mainly be described below.

Figure 12:
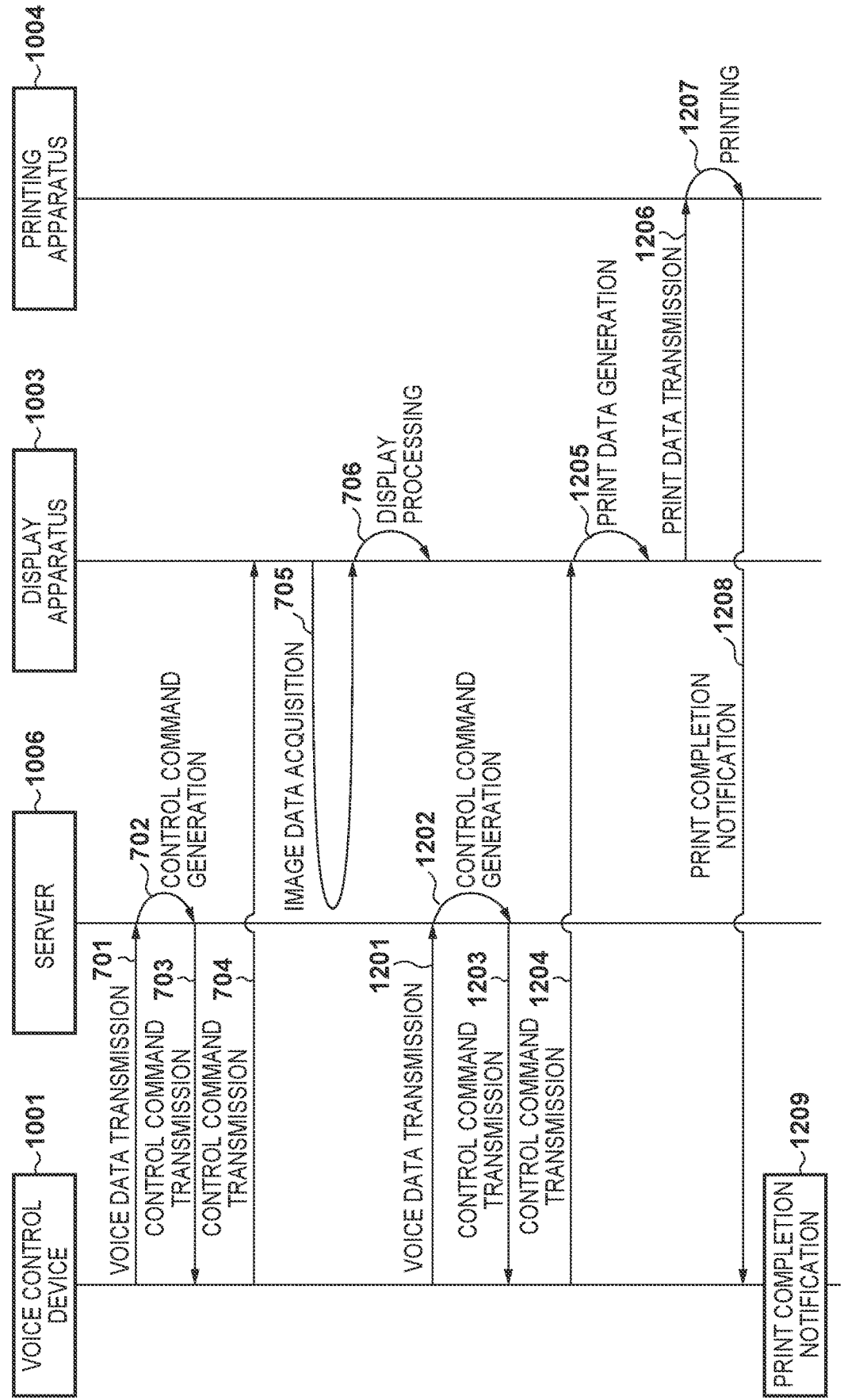
FIG. 12 is a sequence chart showing a sequence associated with print processing.

FIG. 12 is a sequence chart for explaining print processing. Note that processes 701 to 706 are the same as in FIG. 7, and a detailed description thereof will be omitted. Additionally, processes 1201 to 1203 are the same as the processes 10001 to 10003 in FIG. 10, processes 1207 to 1209 are the same processes as the processes 10007 to 10009 in FIG. 10, and a detailed description thereof will be omitted. In the processing shown in FIG. 12, the display apparatus 1003 generates print data. Hence, an external storage device 207 of the display apparatus 1003 stores print software that generates print data interpretable by a printing apparatus 1004, information necessary for communication, and the like.

A voice control device 1001 executes processing according to a control command. Here, an instruction to acquire and print image data corresponding to a photo A is included in the control command. In FIG. 12, the display apparatus 1003 generates print data. Hence, the voice control device 1001 transmits the control command to the display apparatus 1003 (process 1204).

The display apparatus 1003 executes processing according to the received control command. Since the image data is already acquired for display, the display apparatus 1003 generates print data based on the already acquired image data (process 1205). Note that as in the first and second embodiments, if the print instruction from the user is a simple instruction "print the photo A displayed on the display apparatus 1003", pieces of information concerning a print setting are not included. Hence, in this embodiment as well, if the pieces of information concerning a print setting are not included in the instruction by voice, a predetermined print setting is used as the print setting of the image, as in the first and second embodiments.

More specifically, the display apparatus 1003 generates print data by applying a predetermined print setting registered in advance in the display apparatus 1003. Note that a CPU 203 of the display apparatus 1003 analyzes the control command and determines whether pieces of information concerning a print setting are included in the control command. If the pieces of information are included in the control command, the CPU 203 of the display apparatus 1003 acquires the pieces of information concerning the print setting included in the control command. On the other hand, if the pieces of information concerning the print setting are not included in the control command, the CPU 203 of the display apparatus 1003 acquires pieces of information concerning a predetermined print setting. Here, as the pieces of information concerning the predetermined print setting, pieces of information (values) concerning a print setting registered in advance in the display apparatus 1003 are acquired. Then, print data is generated by applying the acquired pieces of information concerning the print setting.

At this time, the display apparatus 1003 may display the pieces of information concerning the print setting. Note that whether the pieces of information concerning the print setting are included may be determined not by the display apparatus 1003 but by the server 1006 or the voice control device 1001. When the server 1006 performs the determination, the server 1006 determines whether the pieces of information concerning the print setting are included in the voice data from the voice control device 1001. If the pieces of information concerning the print setting are not included, a control command is generated by applying predetermined set values registered in advance in the server 1006. Hence, the display apparatus 1003 can generate print data based on the set values included in the control command.

When the voice control device 1001 performs the determination, the voice control device 1001 analyzes the received voice or the control command acquired in the process 1203 and determines whether the pieces of information concerning the print setting are included. If the pieces of information concerning the print setting are not included, a control command is generated by applying predetermined set values registered in advance in the voice control device 1001. Accordingly, the display apparatus 1003 can generate print data based on the set values included in the control command. The display apparatus 1003 transmits the print data generated in the process 1205 to the printing apparatus 1004 (process 1206).

With the above-described processing, the user can print a desired photo by a simple operation. In addition, the load on the server 1006 and the voice control device 1001 can be reduced.

Note that an example in which pieces of information concerning a predetermined print setting are registered in the display apparatus 1003 has been described above. However, the server 1006 may hold the pieces of information concerning the predetermined print setting. That is, the server 1006 determines whether pieces of information concerning a print setting are included in the voice data from the voice control device 1001 in the process 1201. Upon determining that the pieces of information concerning a print setting are not included in the voice data, the server 1006 generates a control command including pieces of information concerning a predetermined print setting registered in advance in the server 1006. Then, the server 1006 transmits the control command to the display apparatus 1003 via the voice control device 1001. The display apparatus 1003 generates print data in accordance with the received control command.

Additionally, in this embodiment as well, when the display apparatus 1003 executes the processing associated with the print setting described in [Modification] of the first embodiment by replacing the server 1006, the same processing as in each example of [Modification] of the first embodiment can be executed.

Even in a modification, a description of the same processes as in the first embodiment will be omitted, and portions different from the first embodiment will mainly be described below.

In this embodiment as well, if the pieces of information concerning the print setting are not included in the voice data, the user may be notified by voice that printing is performed using predetermined set values. More specifically, if the display apparatus 1003 determines that the pieces of information concerning the print setting are not included in the print instruction by the voice of the user, the voice control device 1001 notifies the user by voice that printing is performed using predetermined set values. One of the voice control device 1001 and the server 1006 may determine whether the pieces of information concerning the print setting are included, as a matter of course. In addition, the user may be notified by a question-type voice, or the print setting may be determined or changed by receiving a reply from the user to the question, as in the first embodiment. Additionally, in this embodiment as well, the user may be notified of the set values not by a voice but by display. More specifically, a control command may be transmitted from the voice control device 1001 or the server 1006 to the display apparatus 1003, and the display apparatus 1003 may display the set values to be applied.

In addition, one of the display apparatus 1003, the voice control device 1001, and the server 1006 may confirm whether information is included in the instruction for each necessary item of the print setting. The display apparatus 1003 can generate print data by applying a predetermined set value registered in advance in one of the display apparatus 1003, the voice control device 1001, and the server 1006 for an item that is not included in the voice.

Additionally, as shown in FIG. 14, a plurality of print settings may be provided. A predetermined print setting is selected from them based on the print instruction. In addition, a plurality of print settings may be provided for one data type. Furthermore, the predetermined print setting may be changeable by an instruction of the user.

In addition, when the voice control device 1001 can specify the name of the user who has requested printing from the voice "print the photo A displayed on the display apparatus 1003", voice data may be generated by adding the user name.

In addition, after the print completion is notified and before printing using another print data is instructed, the user inputs a copy addition instruction by voice, thereby enabling execution of re-printing using the same image data for the added copies. In addition, after the print completion is notified and before printing using another print data is instructed, the user may instruct a different print setting by voice, thereby enabling execution of re-printing of the different print setting using the same image data.

In addition, if an instruction associated with the print speed is included in the instruction by voice, one of the display apparatus 1003, the server 1006, and the voice control device 1001 may change the print setting to be applied based on the instruction. Furthermore, one of the display apparatus 1003, the server 1006, and the voice control device 1001 may analyze, for example, the set values in a print instruction received in the past predetermined period, thereby reflecting the user's preference concerning the print setting. That is, the registered value of a predetermined print setting may be changed based on the preference analysis result.

Case in Which User Inquires about Setting Value Settable in Print Setting

In the third embodiment, a case in which the user inquires about a settable set value will be described. As in the first embodiment, the display apparatus 1003 executes display processing in the process 706 of FIG. 10. After that, the voice instruction in the process 1501 to the voice notification in the process 1505 shown in FIG. 15 are performed, and the user is notified of the settable set value. Alternatively, the query of the set value may be made before voice data communication in the process 701.

Other Embodiments

In the above-described embodiments, a form in which a photo displayed on the display apparatus 1003 is printed has been described. However, printing may be instructed in another form. For example, the user utters "print a file A" next to the wake word. The voice control device 1001 transmits voice data corresponding to the voice "print a file A" to the server 1006. Then, the server 1006 may search data managed for the user for data with a name "file A" and generate print data.

Additionally, in the above-described embodiments, a case in which image data corresponding to the photo is printed has been described. However, the data of the print target is not limited to image data and may be document data. Furthermore, in the above-described embodiments, a form in which the printing apparatus 1004 performs printing in accordance with the print instruction of the voice uttered by the user has been described. However, the printing apparatus 1004 may execute print processing based on print data generated by an instruction other than a voice for print software (for example, a printer driver) installed in the personal computer. Note that the instruction other than a voice is an instruction input by an operation using a pointing device or an operation using a touch panel.

Additionally, in the above-described embodiments, Bluetooth has been described as an example of short-distance wireless communication. However, another communication method may be used. For example, WiFiAware may be used in place of Bluetooth. Also, in the above-described embodiments, priority voice output of a set value has been described as an example. However, this may be replaced with priority voice output of a setting item.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-223057, filed Nov. 20, 2017, which is hereby incorporated by reference herein in its entirety.

What is claimed is:

1. A control system including a printing apparatus for performing print processing and a server system,
the server system comprising:
a transmission unit configured to, in a case in which a voice instruction received by a voice control device is a query regarding the printing apparatus, transmit printing apparatus information concerning the printing apparatus without performing processing related to content used for the print processing, a voice notification corresponding to the printing apparatus information being performed by the voice control device based on the printing apparatus information being transmitted; and
a specification unit configured to, in a case in which a voice instruction received by the voice control device is a print instruction for printing the content and a print setting value corresponding to a first item is included in the print instruction and a print setting value corresponding to a second item is not included in the print instruction, specify the content corresponding to the print instruction, the print setting value corresponding to the first item included in the print instruction, and a predetermined print setting value for the second item, the predetermined print setting value having been set in advance before the print instruction is received, the printing apparatus comprising:
a print control unit configured to perform the print processing based on the content, the print setting value corresponding to the first item, and the predetermined print setting value for the second item specified by the specification unit.

2. The system according to claim 1, wherein the server system further comprises an acquisition unit configured to acquire the printing apparatus information, and
wherein the transmission unit transmits the acquired printing apparatus information to the voice control device to cause the voice control device to notify a user by voice.

3. The system according to claim 1, wherein the server system further comprises a determination unit configured to determine whether the voice instruction received by the voice control device is the query regarding the printing apparatus, and
wherein in a case in which the determination unit determines that the voice instruction is the query regarding the printing apparatus, the transmission unit transmits the printing apparatus information to the voice control device to cause the voice control device to notify the user by voice.

4. The system according to claim 1, wherein the printing apparatus performs print processing using ink.

5. The system according to claim 1, wherein the transmission unit transmits information concerning paper available for the printing apparatus as a response to the query.

6. The system according to claim 1, wherein the transmission unit transmits information concerning paper available for the printing apparatus as a response to the query, such that information concerning paper having a higher use frequency is preferentially notified by voice over information concerning paper having a lower use frequency.

7. The system according to claim 1, wherein the voice control device connects to an access point, based on an instruction received from a terminal via wireless communication based on Bluetooth, and
the printing apparatus communicates with the server system via the access point.

8. The system according to claim 1, wherein the server system further comprises a registration unit configured to register identification information concerning the printing apparatus based on a user operation on the printing apparatus, and
wherein the print control unit performs the print processing after the identification information is registered in the server system by the registration unit.

9. The system according to claim 8, wherein the identification information is registered in the server system based on the user operation on a display unit of the printing apparatus.

10. A control method executed in a control system including a printing apparatus for performing print processing and a server system, comprising:
transmitting, in a case in which a voice instruction received by a voice control device is a query regarding the printing apparatus, printing apparatus information concerning the printing apparatus without performing processing related to content used for the print processing, a voice notification corresponding to the printing apparatus information being performed by the voice control device based on the printing apparatus information being transmitted;
specifying, in a case in which a voice instruction received by the voice control device is a print instruction for printing the content and a print setting value corresponding to a first item is included in the print instruction and a print setting value corresponding to a second item is not included in the print instruction, the content corresponding to the print instruction, the print setting value corresponding to the first item included in the print instruction, and a predetermined print setting value for the second item, the predetermined print setting value having been set in advance before the print instruction is received; and
performing the print processing based on the specified content, the print setting value corresponding to the first item, and the predetermined print setting value for the second item.

11. The method according to claim 10, further comprising acquiring the printing apparatus information,
wherein the acquired printing apparatus information is transmitted to the voice control device to cause the voice control device to notify a user by voice.

12. The method according to claim 10, further comprising determining whether the voice instruction received by the voice control device is the query regarding the printing apparatus,
wherein in a case in which it is determined that the voice instruction is the query regarding the printing apparatus, the printing apparatus information is transmitted to the voice control device to cause the voice control device to notify the user by voice.

13. The method according to claim 10, wherein the printing apparatus performs print processing using ink.

14. A control system including a voice control device, a printing apparatus, and a server system,
the voice control device comprising:
a reception unit configured to receive instruction by voice,
the server system comprising:
a transmission unit configured to, in a case in which an instruction received by the voice control device is a query regarding the printing apparatus, transmit printing apparatus information concerning the printing apparatus without performing processing related to content used for the print processing, a voice notification corresponding to the printing apparatus information being performed by the voice control device based on the printing apparatus information being transmitted; and
a specification unit configured to, in a case in which an instruction received by the voice control device is a print instruction for printing the content and a print setting value corresponding to a first item is included in the print instruction and a print setting value corresponding to a second item is not included in the print instruction, specify the content corresponding to the print instruction, the print setting value corresponding to the first item included in the print instruction, and a predetermined print setting value for the second item, the predetermined print setting value having been set in advance before the print instruction is received,
the printing apparatus comprising:
a print control unit configured to perform the print processing based on the content, the print setting value corresponding to the first item, and the predetermined print setting value for the second item specified by the specification unit.

15. The system according to claim 14, wherein the transmission unit transmits information concerning paper available for the printing apparatus as a response to the query.

16. The system according to claim 14, wherein the transmission unit transmits information concerning paper available for the printing apparatus as a response to the query, such that information concerning paper having a higher use frequency is preferentially notified by voice over information concerning paper having a lower use frequency.

17. The system according to claim 14, wherein the voice control device connects to an access point, based on an instruction received from a terminal via wireless communication based on Bluetooth, and the printing apparatus communicates with the server system via the access point.

18. The system according to claim 14, wherein the server system further comprises a registration unit configured to register identification information concerning the printing apparatus based on a user operation on the printing apparatus, and wherein the print control unit performs the print processing after the identification information is registered in the server system by the registration unit.

19. The system according to claim 18, wherein the identification information is registered in the server system based on the user operation on a display unit of the printing apparatus.

* * * * *